(12) United States Patent
Enis et al.

(10) Patent No.: US 8,839,875 B2
(45) Date of Patent: *Sep. 23, 2014

(54) METHOD AND APPARATUS FOR SEQUESTERING CO2 GAS AND RELEASING NATURAL GAS FROM COAL AND GAS SHALE FORMATIONS

(76) Inventors: Ben M. Enis, Henderson, NV (US); Paul Lieberman, Torrance, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/930,117

(22) Filed: Dec. 28, 2010

(65) Prior Publication Data

US 2011/0209882 A1 Sep. 1, 2011

Related U.S. Application Data

(60) Provisional application No. 61/284,960, filed on Dec. 28, 2009.

(51) Int. Cl.
*E21B 19/00* (2006.01)
*E21B 43/16* (2006.01)
*E21B 43/00* (2006.01)

(52) U.S. Cl.
CPC ...... *E21B 43/164* (2013.01); *F23J 2900/15061* (2013.01); *E21B 43/006* (2013.01); *F23J 2215/50* (2013.01)
USPC .......................... 166/402; 166/90.1; 166/263

(58) Field of Classification Search
None
See application file for complete search history.

(56) References Cited

U.S. PATENT DOCUMENTS

| | | | |
|---|---|---|---|
| 2,645,291 | A | 7/1953 | Voorhees |
| 3,108,636 | A | 10/1963 | Peterson |
| 3,205,944 | A | 9/1965 | Walton |
| 3,310,112 | A | 3/1967 | Nielson et al. |
| 3,368,627 | A | 2/1968 | Hurst et al. |
| 3,384,416 | A | 5/1968 | Ruehl et al. |
| 3,396,107 | A | 8/1968 | Hill |
| 3,623,552 | A | 11/1971 | Valrogs |
| 3,664,422 | A | 5/1972 | Bullen |
| 3,765,488 | A | 10/1973 | Pence, Jr. |
| 3,842,910 | A | 10/1974 | Zingg et al. |
| 3,954,626 | A | 5/1976 | Greminger, Jr. et al. |
| 4,043,395 | A | 8/1977 | Every et al. |
| 4,374,545 | A | 2/1983 | Bullen et al. |
| 4,513,821 | A * | 4/1985 | Shu .............................. 166/402 |
| 4,701,270 | A | 10/1987 | Bullen et al. |
| 5,147,111 | A * | 9/1992 | Montgomery .................. 299/16 |
| 5,417,286 | A * | 5/1995 | Palmer et al. ............... 166/308.1 |
| 5,464,061 | A * | 11/1995 | Wilson et al. ................. 166/302 |
| 6,412,559 | B1 * | 7/2002 | Gunter et al. ................. 166/271 |

(Continued)

OTHER PUBLICATIONS

Hamelinck et al., Potential for CO2 sequestration and enhanced coalbed methane production in the Netherlands, Mar. 2001, retrieved by the PTO on Feb. 8, 2011.

*Primary Examiner* — Angela M DiTrani
(74) *Attorney, Agent, or Firm* — J. John Shimazaki

(57) ABSTRACT

A system for sequestering $CO_2$ gas and releasing natural gas from underground coal and/or gas shale formations using $CO_2$ gas captured from the flue gas of a coal burning power plant, and processing it to produce cold liquid pressurized $CO_2$, and injecting the cold liquid $CO_2$ under pressure to create fractures within the formation and causing the $CO_2$ to be adsorbed into the coal or gas shale and $CH_4$ to be desorbed, released and recovered. No high volume of water, no toxic additives to the water and no sand proppants are used for hydro-fracture of the gas shale or coal bed.

20 Claims, 16 Drawing Sheets

(56) References Cited

U.S. PATENT DOCUMENTS 7,264,049 B2  9/2007  Maguire
2005/0045325 A1  3/2005  Yu
2005/0247447 A1  11/2005  Spring et al.
2009/0301704 A1  12/2009  Dillett et al.

* cited by examiner

| | PSIA | deg F | #/CU FT | BTU/# | BTU/# DIFF |
|---|---|---|---|---|---|
| STEP ONE | 90 | 70 | 0.45949 | 126.18 | |
| TURBOCOMPRESSOR #1 | | | | | 15.64 |
| STEP TWO | 123 | 135.2 | 0.55827 | 141.82 | |
| HEAT EXCHANGER | | | | | |
| STEP THREE | 123 | 70 | 0.62843 | 125.95 | |
| TURBOCOMPRESSOR #2 | | | | | 29.44 |
| STEP FOUR | 221 | 192.7 | 0.91283 | 155.39 | |
| HEAT EXCHANGER | | | | | |
| STEP FIVE | 221 | 70 | 1.1314 | 125.28 | |
| TURBOEXPANDER #2 | | | | | -35.216 |
| STEP SIX | 55 | -80.2 | 0.39398 | 90.064 | |
| TURBOEXPANDER #1 | | | | | -19.31 |
| STEP SEVEN | 20 | -162.1 | 0.18251 | 70.754 | |

CARBON DIOXIDE

| PRESSURE | | TEMPERATURE | DENSITY | ENTHALPY | |
|---|---|---|---|---|---|
| P atm | P psia | T F | rho #/cu ft | h BTU/# | |
| 7.5 | 110 | -50 | 1.2 | 317.41 | GASEOUS CO$_2$ |
| 7.5 | 110 | -60 | 72.3 | 169.31 | LIQUID CO$_2$ |
| 317.7 | 4,660 | -39.315 | 73.9 | 182.70 | LIQUID CO$_2$ |

DENSITIES AT 40 DEG F

| PSIA | CH4 #/CU FT | CO2 #/CU FT |
|---|---|---|
| 4,000 | 14.04 | 64.39 |
| 800 | 2.72 | 57.24 |
| 400 | 1.27 | 4.14 |

METHOD AND APPARATUS FOR SEQUESTERING CO2 GAS AND RELEASING NATURAL GAS FROM COAL AND GAS SHALE FORMATIONS

RELATED APPLICATIONS

This application claims priority from U.S. Provisional Application Ser. No. 61/284,960, filed on Dec. 28, 2009.

FIELD OF THE INVENTION

The invention relates to a method and apparatus for sequestering $CO_2$ gas and releasing natural gas from coal and/or gas shale formations, and in particular, to using $CO_2$ gas captured from the flue gas of a coal burning power plant, and processing it to produce cold liquid pressurized $CO_2$, and injecting it under pressure to create fractures within the formation to increase its permeability, and causing the $CO_2$ to be adsorbed and $CH_4$ to be desorbed, wherein natural gas can be released and recovered from the formation.

BACKGROUND OF THE INVENTION

Hydraulic fracturing is a process that creates fractures in rock formations (or reservoirs), which has the effect of increasing the output of a well. The most important industrial use of this process is for stimulating oil and gas wells. Natural fracturing includes volcanic dikes and sills and frost weathering. Man-made fractures are commonly extended into targeted rock formations and are typically created using wellbores drilled into the formations to enhance oil and natural gas recovery, such as from coal beds and shale rock, etc.

Hydraulic fractures are typically extended by creating internal fluid pressure into the formations which opens the fractures and causes them to extend through the formations. The fracture width is typically maintained by introducing a proppant, such as sand, ceramic, or other particulates, wherein the imposition of the proppant into the openings helps to prevent the fractures from closing when the injection is stopped.

Hydraulic fracturing helps remove natural gas and oil from rock formations deep within the earth's crust where there are insufficient porosity and permeability levels to allow these resources to flow from the reservoir to the wellbore at economic rates. In such case, the fractures preferably provide a conduit or path that connects the reservoir to the well, thereby increasing the area from which natural gas and liquids can be recovered.

The process used includes pumping the fracturing fluid into the wellbore at a rate sufficient to increase its pressure to above the fracture gradient of the rock formation. This pressure causes the rock formation to crack, allowing the fracturing fluid to enter and extend through the formations. To keep this fracture open after the injection stops, a proppant, such as sand, is often added to the fracture fluid. The propped hydraulic fracture then becomes a permeable conduit through which the fluid can flow.

Because drilling a borehole involves using a rotating drill bit, chips and particles of rock are often produced that can adversely affect the passage of fluid through the wellbore, resulting in reduced permeability and flow of fluid into the borehole. The borehole can also be sealed by the surrounding rock, wherein hydraulic fracturing can be used to increase the flow of fluid through the rock.

Various types of proppant, including sand, resin-coated sand, and man-made ceramics can be used depending on the desired permeability or grain strength. The injected fluid mixture is typically about 99% water and sand, although the fracture fluid can also be gel, foam, nitrogen, carbon dioxide or even air, etc.

In addition to the fluid, certain chemicals are often added to enhance the effectiveness of the fracturing i.e., the flow of natural gas to the surface. Thus, considerable environmental concerns have arisen, including the possibility that chemicals and other waste fluids might bleed into water aquifers, as well as the possible erosion and deformation that can result once fractures have been created and resources have been removed.

Environmental and health concerns associated with hydraulic fracturing include contamination of ground water, risks to air quality, the migration of gases and chemicals to the surface, the creation of seismic events, and the potential mishandling of waste. The potential costs associated with environmental clean-up, loss of land value, and human and animal health concerns are still being investigated and evaluated.

Hydraulic fracturing has favorably increased the production of natural gas from coal beds and shale rock formations in recent years. In the past, methane gas has been released during mining and post-mining activities, including various methane emissions which can be divided into the following categories:

Underground Mining: Methane gas can be removed from underground mines before and during mining by using degasification systems. The gas can be vented, flared (not currently done in the U.S.), or recovered for its energy content. Indeed, up to 50 to 60 percent of methane can typically be recovered from mines using degasification, wherein the remainder is released into the atmosphere. In underground mining, methane gas is often released into the mine shafts wherein methane is diluted into the ventilation air and then vented to the atmosphere.

Surface Mining: During surface mining, methane is typically released into the atmosphere as the overlying rock strata are removed, although for this type of release, no emissions mitigation options are currently being used. In theory, some pre-mining degasification and recovery could occur in certain surface mines. However, the low gas content of most surface mines relative to that of underground mines makes it unlikely that significant recovery would be technically feasible, let alone cost-effective.

Abandoned Mines: There are several thousand abandoned coal mines in the United States today. Of these, the EPA has identified some 400 that are considered "gassy." Even though active mining no longer occurs, these mines can still produce significant methane emissions from diffuse vents, fissures, or boreholes, etc., which can be extracted and used to generate power, etc., although these emissions are not quantified or included in U.S. inventory estimates.

Coal mines already employ a range of technologies for recovering methane gas. These methods have been developed primarily for safety reasons, as a supplement to ventilation systems, to circulate dangerous methane gas from the mines. The major degasification technologies currently used in the U.S. include vertical wells, long-hole and short-hole horizontal boreholes, and gob wells. The quality of the gas extracted by these methods determines how they may be used. Vertical wells and in-mine horizontal boreholes produce nearly pure methane, while gob wells, which recover post-mining methane, typically recover methane mixed with air.

Even when degasification systems are used, mines still emit significant quantities of methane via ventilation systems. Technologies are in development that would catalytically oxidize the low concentrations of methane in ventilation air, producing usable thermal heat as a by-product. Methane recovered by degasification can be used for pipeline injection, power generation, on-site use in thermal coal drying facilities, or sold to nearby commercial or industrial facilities, etc. At present, most recovered coal mine methane is sold through natural gas pipelines.

Mines that are already recovering methane represent opportunities for utilities to work with mine operators to develop a use strategy. Utilities may also be able to participate in projects that are not currently recovering methane by implementing projects that include both gas recovery and utilization.

Coal bed gas formations or reservoirs often contain an orthogonal fracture set called cleats that are often oriented perpendicular to the bedding (which is nearly horizontal), which provide the primary conduit for upward fluid flow. Gas typically diffuses from the matrix into these cleats and flows up to the well bore. In coal bed gas reservoirs, the key parameters for controlling the amount of gas in place include coal bed thickness, coal composition, gas content, and gas composition. Coal composition refers to the amount and type of organic constituents found in the coal, which has a significant effect on the amount of gas that can be adsorbed and/or desorbed. Gas contents in coal seams vary widely (<1 to >25 m3/tonne) and are a function of coal composition, thermal maturity, burial and uplift history, and the addition of migrated thermal or biogenic gas. Note that 1 ton is 2,000 pounds and 1 tonne is 2,406.2 pounds. Gas composition is generally greater than 90% methane, with minor amounts of liquid hydrocarbons, carbon dioxide, and/or nitrogen.

Gas productivity from coal bed reservoirs is controlled primarily by the coal's permeability and the gas-saturation state. Permeability in producing areas typically ranges from a few millidarcies to a few tens of millidarcies, although permeabilities exceeding 1 Darcy have been reported. Absolute permeability increases with time as gas desorbs from the coal, causing the matrix to shrink and the cleats to widen, although this may be offset by a reduction in cleat aperture because of increased net stress caused by reservoir-pressure depletion.

Permeability is a key factor for coal bed methane (CBM) recovery. Coal beds are typically low in permeability, and almost all the permeability is usually due to fractures, which in coal beds are typically in the form of cleats and joints. Coal cleats are of two types: butt cleats and face cleats, which occur at nearly right angles. The face cleats are normally continuous and provide paths of higher permeability while butt cleats are usually non-continuous and end at face cleats.

Gas contained in coal beds are mainly methane and trace quantities of ethane, nitrogen, carbon dioxide and some other gases. Intrinsic properties of coal found in nature determine the amount of gas that can be recovered. The porosity of coal bed reservoirs is usually very small, ranging from 0.1 to 10%. The adsorption capacity of coal is defined as the volume of gas adsorbed per unit mass of coal usually expressed in SCF (standard cubic feet, the volume at standard pressure and temperature conditions) gas/ton of coal. The capacity to adsorb depends on the rank and quality of the coal. The adsorption ranges from 100 to 800 SCF/ton for most coal seams found in the United States. Most of the gas in coal beds is in the adsorbed form.

The permeability that is produced from fractures acts as the major channel for gas to flow—the higher the permeability the higher the gas production. For most coal bed seams found in the United States, the permeability lies in the range of 0.1 to 50 millidarcies. The permeability changes with the stress applied to the formation. Coal displays a stress-sensitive permeability and this process plays an important role during stimulation and production operations.

Hydraulic fracturing can be used to enhance gas recovery from coal beds by increasing their permeability. Since methane is stored (adsorbed) over time on the micropores of the coal itself, and this storage capacity is a function of the amount of pressure that has been exerted on the coal surfaces, i.e., the higher the pressure the greater the storage potential, production or release of gas from the coal normally requires the reduction of pressure within the formation. This pressure reduction frees the methane molecules from the coal bed and allows upward gas migration.

Water/gas separators used for conventional gas production are often modified to accommodate copious amounts of "produced" water and associated coal fines (small particles of coal that can pollute the water). After hydrostatic pressure is reduced, methane gas can be desorbed from the coal and is then free to migrate through the permeable strata and fractures to an area of lower pressure, i.e., ideally into well bores that created the pressure reduction. Since water must be withdrawn to reduce the pressure and allow gas migration, the volume of gas produced tends to build from a low initial rate to a maximum rate several years after the onset of production. When reservoir pressure drops below 150 psi, the well is no longer considered economic. It is estimated that less than 50% of the coal bed methane in place can be economically recovered by reservoir pressure depletion strategy. Thus, in areas like the San Juan Basin, enhanced production techniques have been used.

Another enhancement technique available introduces nitrogen under high pressure through injector wells into individual coal beds. Nitrogen sorption displaces the methane on the coal molecules and reduces the partial pressure of the methane. Beginning in the 1980's, some companies have experimented with this technique and found that up to 80% of the methane can be recovered with this strategy.

Gas bearing shale and tight sands are also making an emergence due to the application of newer technologies such as horizontal drilling and advanced stimulation methods including hydraulic fracturing. In this application we are not considering oil shale; we are considering gas shale. Oil shale is a term used to cover a wide range of fine-grained, organic-rich sedimentary rocks. Oil shale does not contain liquid hydrocarbons or petroleum as such but organic matter derived mainly from aquatic organisms. This organic matter, kerogen, may be converted to oil through destructive distillation or exposure to heat. The recovered organic fraction is then distilled, or pyrolyzed to produce the following products: crude shale oil, flammable hydrogen gas, and char.

Gas shale is productive in releasing natural gas when the surface area is exposed to other elements such as carbon dioxide. The greater the exposed surface area, the greater the efficiency and speed at which the gas is desorbed and released from the surface. Indeed, when gas shale is exposed to carbon dioxide, and carbon dioxide is adsorbed, methane gas (that has been adsorbed into the shale over time) will be desorbed and released.

Coals are sedimentary rocks containing more than 50 wt % organic matter, whereas gas shale contains less than 50 wt % organic matter. Methane is generated from the transformation of organic matter by bacterial (biogenic gas) and geochemical (thermogenic gas) processes during burial. The gas is stored by multiple mechanisms including free gas in the micropores and joints, and adsorbed gas on the internal surfaces of the organic matter. Nearly all coal bed gas is considered to be adsorbed gas, whereas gas shale is a combination of adsorbed gas and free gas. Free gas is the methane that is trapped within the pores or joints of the shale or coal structure.

True gas shale has adsorbed gas on the surfaces of the organic content, just like coal, as well as some free gas in the pore spaces and joints, unlike coal, which has virtually no macro-porosity. In such case, adsorbed gas is proportional to the total organic carbon (TOC) of the gas shale, and free gas is proportional to the effective porosity and gas saturation in the pores of the formation.

Gas shale has become an increasingly important source of natural gas in the United States, and interest has spread to Canada and Europe. This is because gas shale is found in significant abundance in many areas of the world and can be processed relatively economically to produce natural gas using the above described hydraulic fracturing methods.

Typically, gas shale is a solid of low permeability, and therefore, gas production in commercial quantities requires fracturing to provide increased permeability. While some formations may contain natural fractures, for profitable production of natural gas from gas shale, modern technology is required, such as hydraulic fracturing and horizontal drilling, etc.

Shale that hosts economic quantities of natural gas has a number of common properties. They are rich in organic material, and are usually mature petroleum source rock in a thermogenic gas window. They are sufficiently brittle and rigid enough to maintain open fractures and some of the gas produced can be held in natural fractures, some in pore spaces, and some adsorbed onto the surface of the organic material. The gas in the fractures can be released immediately, whereas, the gas adsorbed onto organic material is typically released as the formation pressure declines.

Because gas shale normally has insufficient permeability to allow significant fluid flow from the formation to the well bore, for gas shale to become a profitable source of natural gas, it is important that new technologies be developed to improve its permeability. In fact, with the advent of these new technologies, one analyst expects gas shale to supply as much as half the natural gas production in North America by 2020.

In gas shale formations, natural gas can sometimes be produced through more-permeable sand or silt layers interbedded with the shale, through natural fractures, or from the shale matrix itself. But in other cases, natural fractures are healed by a mineral filling and must be forced open by stimulation. It is also possible to have both shale and coal interbedded within a single reservoir, resulting in gas contributions from both lithologies.

In U.S. Pat. No. 7,264,049, issued to Maguire, entitled "In situ method of coal gasification," an in-situ process for coal gasification using liquefied gases and combustion of the kerogen for heat release is provided. Maguire provides an in-situ process for coal gasification and the production of gas hydrates wherein a network of fractures is formed by injecting liquefied gases into a horizontally disposed fracturing borehole and allowing it to vaporize. The coal is thereafter ignited and the gases released by burning coal are recovered from the fractured formations. The crux of "Maguire" is a fracturing method that creates a large fracture system to apply heat to the coal reservoir, which consists of injecting large amounts of liquid nitrogen at very high rates into the horizontal fracturing boreholes.

One disadvantage of Maguire is that it uses combustion and heat to break up the formation and release gas from its fractures. In doing so, Maguire teaches using kerogen which is ignited within the formation to release the pressurized gas. Maguire's method is also used in coal beds, and does not specifically apply to gas shale.

U.S. Pat. No. 4,374,545, issued to Bullen, et al., entitled, "Carbon Dioxide Fracturing Process and Apparatus," describes a method of fracturing in an underground stratigraphic formation that is penetrated by a borehole. Liquefied gas and a proppant are pumped into the formation via the borehole pipe to induce fractures in the formation and these fracture spaces are kept open by the proppant. Once injected, the liquid pressurized carbon dioxide is exposed to warmer temperatures, which causes the liquid to convert to a gas to induce further fracturing. The disadvantage of Bullen is that it uses proppants and chemicals that can raise environmental concerns.

One of the main contributors to global warming is believed to be the increase in carbon dioxide gas emitted into the earth's atmosphere by various man-made activities and technologies such as coal burning power plants. The main contributors to carbon dioxide emissions that can affect the earth's atmosphere and therefore increase global warming include solid fuels, such as coal, liquid fuels, such as gasoline, and gaseous fuels, such as natural gas. While there is strong motivation to use coal for the generation of energy due to its efficiency and abundance, there is also a strong interest in eliminating the undesired emission of carbon dioxide gas into the atmosphere which is caused by the combustion of coal in standard coal combustion power plants.

One of the existing technologies used to eliminate excess carbon dioxide emissions involves "capturing" the $CO_2$ gas as it is being emitted from smokestacks, and storing it. The idea of carbon capture and storage (CCS)—first introduced in the 1970's—began by making use of existing underground reservoirs in which to store the $CO_2$ gas. The available storage space in underground reservoirs is probably large enough to store all the carbon dioxide gas contained in all the remaining fossil fuel reserves throughout the world.

Recently, leading science and energy institutes advocated strongly for the further development of carbon capture and storage technology. For example, capturing $CO_2$ from smokestacks for the purification of natural gas or at ammonia production facilities is a practice that has existed for years. Moreover, injection and storage of carbon dioxide gas is already occurring in the North Sea, Algeria, and Texas.

While some of these technologies have gained credibility in recent years, many experts still believe that because of the rapid use of the world's remaining fossil fuel supplies, it is necessary to further lower the environmental impact caused by these technologies in an effort to prevent catastrophic climate changes in the future. The problem at hand is that the process of capturing, transporting and storing carbon dioxide gas from coal combustion power plants can dramatically raise energy consumption costs and cause serious health and environmental issues and concerns. For example, if the energy used to capture $CO_2$ emissions is derived directly from the fossil fuels themselves, the benefits of capturing and storing the $CO_2$ will be offset by the very same energy intensive process. And, if the energy comes from renewable sources, the technology would be rendered unnecessary as it would be much more efficient to generate electricity directly from the renewable source.

Indeed, it has been discovered that capturing $CO_2$ from smokestacks and compressing it for transport can be one of the most energy-intensive aspects of the process. According to the International Panel of Climate Change (IPCC), which prepared a comprehensive study, capturing technology (including compression of the gas for further transport and storage) can raise the energy consumption of a coal combustion power plant by an average of 32 percent.

Capturing carbon dioxide in rocks also requires a significant infrastructure that is comparable to today's coal industry, which can also lead to significant amounts of industrial wastes and mining tailings—for example, fuel ash from coal plants. The process also generates large amounts of waste materials (apart from the carbonised rocks themselves), and for every ton of carbon dioxide stored in rock, 2.87 to 45.18 tons of disposable materials would be created.

For all of the above reasons, a new and improved method and apparatus is needed for the capture and storage of $CO_2$ gases emitted from coal combustion power plants, which can offset the high costs and disadvantages associated with current carbon dioxide extraction and removal methods, such that the world's coal reserves can be used without the consequences of adding to man-made global climate changes, and the high cost of producing energy. Moreover, for the above reasons, there is also a need to develop new and improved technologies for increasing the permeability of coal and gas shale formations to make better use of the world's supply of natural gas contained therein, including the gas stored in the pores and joints of the underground strata and adsorbed onto the surface of the rock formations, etc. Nevertheless, there is also a need to develop improved technologies that will avoid the use of chemicals and the production of waste materials, etc., that can be harmful to the environment.

SUMMARY OF THE INVENTION

The present invention preferably relates to a method and apparatus for capturing the flue gas of a coal fired power plant, incinerator or chemical processing plant, and separating the $CO_2$ gas therefrom, and converting the $CO_2$ gas captured from the power plant into a cold pressurized liquid $CO_2$, and injecting it under pressure into an underground stratum or layer of coal and/or gas shale, and in particular, releasing the pressurized liquid $CO_2$ through perforations, and using it to create narrow elongated fractures and openings within the layers, to increase their permeability, thereby increasing the flow of natural gas found in the pores and joints therein, as well as increasing the adsorption of $CO_2$ and simultaneous desorption of $CH_4$, such that the natural gases normally found within the formations can be released, recovered and sold to offset the overall cost of capturing and sequestering the $CO_2$.

$CO_2$ gas is preferably captured and separated from the flue gases of a coal burning power plant, incinerator, or chemical processing plant, using a standard process, such as one of the following: 1) Chemical and physical absorption, 2) Solid physical adsorption-pressure swing and temperature swing adsorption, 3) Low temperature distillation (cryogenic separation); and 4) Membrane separation. In one method, an MEA chemical absorber is used to separate the $CO_2$ gas from the flue gases wherein the system comprises an absorber, a regenerating unit, a condenser, storage tank, and heat exchanger, etc. This chemical absorption system comprises amine based processes for the removal of acid gas impurities ($CO_2$ and $H_2S$), wherein alkanolamines (MEA, DEA, and MDEA) are used to remove $CO_2$ from the flue gas stream by the exothermic reaction of $CO_2$ with the amine functionality of the alkanolamine.

In another aspect, $CO_2$ gas can be separated and sequestered either before the coal is burned or afterwards, depending on the type of equipment used. Technologies that can be used for this purpose are disclosed in Applicants' related application Ser. No. 12/321,689, which was published on Aug. 20, 2009, as publication no. US20090205364, entitled "METHOD AND APPARATUS FOR REMOVING CARBON DIOXIDE GAS FROM COAL COMBUSTION POWER PLANTS," which is incorporated herein by reference, and is preferably used to separate the $CO_2$ gas from the other elements, although any other method or apparatus for capturing $CO_2$ gas can be used.

The captured $CO_2$ gas is then pressurized, chilled and liquefied, although, if the $CO_2$ gas is chilled first, the $CO_2$ gas could form dry ice. Thus, for optimal results, the $CO_2$ gas is preferably pressurized first, prior to being chilled. For example, in the first step, the $CO_2$ gas is preferably pressurized using a conventional compressor, but because the compression process heats the $CO_2$ gas, it must be cooled. Preferably, a first heat exchanger uses cold water circulated to cool the $CO_2$ gas, and then, a second heat exchanger uses super chilled air produced by an associated turbo compressor and turbo expander set. Once the $CO_2$ gas has been sufficiently chilled, such as down to minus 60 degrees F., it can be converted into a liquid, and then preferably, the cold liquid $CO_2$ is fed into a cryogenic pump, to increase the pressure thereof, such as up to 5,000 psia, depending on the conditions into which the liquid $CO_2$ will be injected.

The next step involves injecting the pressurized liquid $CO_2$ into the underground coal or shale reservoir or formation using an array of pipes that extend down through the geological layers of rock until the targeted coal layer or gas shale layer is reached. The pipes are preferably made of steel or other strong material and extended down into the targeted layer where there are perforations for releasing and injecting the liquid $CO_2$ directly into the rock formation. The perforated portion of the pipe (with small diameter holes) preferably extends vertically into a thick stratum or horizontally into a thin stratum of coal or shale that contain the adsorbed natural gas.

For any given site, the pipes are preferably spaced apart a predetermined distance from each other depending on the expected reach and effectiveness of the fracturing process used to increase the permeability of the formation and therefore the efficiency of the process. To allow for proper recovery of gas produced within the formation, similar arrays of pipes are preferably extended down into the geological layers to enable the gases to be released and recovered. Preferably, there are more output recovery pipes than input pipes. The specific pattern of pipes can also be predetermined to make efficient use of the equipment and geographic location.

Once the liquid carbon dioxide or $LCO_2$ has been pressurized and chilled, it is ready to be injected into the pipes and released into the strata. However, to avoid premature warming of the liquid $CO_2$, it is desirable to inject liquid nitrogen into the pipe first, which helps to pre-chill the pipe, so that when the $LCO_2$ is injected, it will not change phase to a gas prematurely. Nevertheless, it is not expected that the pipe will stay at the same temperature, and therefore, a thermocouple is preferably provided to measure the temperature of the pipe and thus the extent to which the pipe is pre-chilled can be controlled.

Initially, the $LCO_2$ is allowed to flow into the pipe and flash to gaseous carbon dioxide or $GCO_2$ until a steady state operation can be reached, and then, the cryogenic pump can be turned on to pressurize the $LCO_2$ down into the formation which will continue until the predetermined pressure is reached, which can be up to 5,000 psia or more. Then, as the $LCO_2$ is released through the perforations, the coal or shale within the formation will begin to break up and form fractures therein—it will become rubblized—wherein long narrow passages can be created within the formation to increase its permeability. As more liquid $CO_2$ is injected, and as pressure is increased, additional web-like fractures and patterns can be created that can extend more than 1,000 feet through the formation. Preferably, shut off valves on each pipe are used so that while the injection is performed, and/or after it is completed, the pipes can be sealed to allow the pressure within the formation to build or be maintained.

By forcing the high pressure liquid $CO_2$ into the stratum via a pre-chilled vertical pipe with an end extension of perforations, the high pressure $LCO_2$ is vented through the perforations to fracture a long cavity of small diameter (pencil-like) openings in all radial directions extending from the perforated pipe. The high pressure liquid $CO_2$ is forced through each perforated hole and penetrates the shale or coal stratum, wherein, when the pressure exceeds the fracture gradient of the rock formation, fractures are created in the rock. Not only does this help release the natural gas trapped within the formation's pores and joints, but the broken fragments can then be made more susceptible to adsorption of $LCO_2$ and $GCO_2$, and desorption of $CH_4$, which allows more coal or shale fragments to be exposed to $CO_2$, such that more adsorption can take place, which means that more $CO_2$ can then be sequestered, which also means that more natural gas can be released and recovered from the site.

The newly created surfaces within the drill hole and radiating cracks can cause the $LCO_2$ to warm up. Likewise, pressurizing the $LCO_2$ can increase the temperature thereof, and when the cryogenic pump is shut down, the liquid pressure can decrease. For example, when pressure decreases to 400 psi, and the temperature increases to plus 40° F. (or any other point on the curve), the liquid $CO_2$ can suddenly change phase explosively, wherein the expansion of the gaseous $CO_2$ can extend the reach of the cracks and create more exposed surface area within the stratum. This process of rubblization exposes the material in the product zone further by forming a multitude of smaller particles and a huge sum of exposed surfaces for the capture of $CO_2$ and release of $CH_4$.

While it is preferable that this phase change occur after the pump is turned off, there is a possibility that the phase change could occur before the pipes are sealed. This can depend on the depth of the formation, wherein, at greater depths, the pressure is greater, and therefore, the phase change will be less likely to occur prematurely, whereas, at shallower depths, the pressure will be less, and therefore, the phase change is more likely to occur as the $LCO_2$ is exposed to its warmer surroundings. But regardless of when it takes place, this sudden phase change occurs explosively and radiates fractures in all directions, thereby increasing the volumes of fractures for further adsorption of $CO_2$ and desorption of $CH_4$.

Unlike previous hydraulic fracturing methods, there is no need for a proppant to maintain the width and openings of the fractures created within the formation. This is because the main goal of the invention is to adsorb $CO_2$ onto the coal or gas shale fragments, wherein the $CO_2$ will be stored and sequestered within the formation once the fractures are opened. Indeed, portions of the $LCO_2$ within the cracks act as the proppants before being adsorbed onto the surfaces they are propping. Accordingly, for the time that the fractures remain open, natural gas will preferably continue to be released and flow from the rock formation to the well bore, such that a sufficient amount of natural gas can be recovered to offset the cost of capturing and separating the $CO_2$ gas. In this respect, since the goal of sequestering $CO_2$ is as important as the goal of collecting natural gas, the present method is useful even if some of the natural gas released from the coal or shale remains trapped within the formation and remains unused. There is also no high volume of water and no toxic additives used during the fracturing process, unlike previous methods.

With all vents closed, the pressurization of the formation is allowed to continue, and thus, further fracturing can occur, in which case, $CH_4$ can continue to be desorbed, and $CO_2$ can continue to be adsorbed, into the surfaces made free by the desorption of $CH_4$. This containment is preferably sustained for a residence period of time to permit the $LCO_2$ and $GCO_2$ to be completely adsorbed and the lower density natural gas to migrate into the perforated vertical collection pipes and flow upward to be recovered. The pressure is preferably sustained to reduce the required residence time.

After the appropriate waiting period, which can be about two weeks or more, the pipe valves are preferably opened slowly to allow the pressure to remain in the formation as the gases are released. If the pipes are opened too quickly, pressurized methane will begin rising to the top, but large amounts of liquid $CO_2$ may remain underground within the formation without being adsorbed. By slowly opening the valves, and slowly reducing the pressure, low density $CH_4$ is allowed to buoy past the $LCO_2$ and allow the $CH_4$ to migrate to the recovery pipes, while at the same, allowing $CO_2$ to continue to drop and be adsorbed, and $CH_4$ to continue to be desorbed.

Once the cycle is complete, the recovered $CH_4$ can be transported via pipe or truck. Then, the same process can be repeated, or the pump can be connected to another input pipe, so that the process can be performed in a new location.

One of the objectives of the present method and apparatus is to enable the coal or gas shale formation to be exposed to $CO_2$ within the joints, cracks, fissures and fractures of the rock formation, so that the $CO_2$ molecules will be adsorbed onto the fragments, whereas, the $CH_4$ molecules will be desorbed and released, such that the released natural gas can then be made available by migrating toward the nearby well bore and buoy itself upward through the pipe to the surface. As a consequence, the $CO_2$ can be sequestered and stored in the formation. The methodologies and apparatuses described herein can be altered without departing from the present invention.

DETAILED DESCRIPTION OF THE INVENTION

The proposed approach preferably comprises capturing, pressurizing, chilling and liquefying the $CO_2$ effluent from a coal fired power plant, incinerator or chemical processing plant and then transmitting the pressurized $CO_2$ in liquid form ($LCO_2$) to a site that either has a coal stratum or a gas shale stratum that will sequester the $LCO_2$. There will also be natural gas recovered from the site including after the $LCO_2$ has been adsorbed into the coal or shale and natural gas has been released therefrom, which can be sold to offset the cost of sequestering the $CO_2$. If these strata are located adjacent to the power plant, the captured $LCO_2$ is preferably directly inserted into the strata. If these strata are located a large distance from the power plant the captured $LCO_2$ is preferably collected onto a cryogenic truck trailer or into a pipeline for insertion into the strata. In either case, natural gas will be recovered for sale.

Separation of carbon dioxide gas ($CO_2$) from the flue gases of a power plant, incinerator or chemical processing plant can be accomplished in a variety of ways. For example, the MEA chemical absorber technique for separating $CO_2$ from flue gases can be performed efficiently by the use of high mass flow of super chilled air wherein the flue gases are pressurized and then passed through the tubes of a heat exchanger within a shell of super chilled air. For post combustion $CO_2$ separation there are several approaches available, including: 1) Chemical and physical absorption, 2) Solid physical adsorption-pressure swing and temperature swing adsorption, 3) Low temperature distillation (cryogenic separation); and 4) Membrane separation.

The chemical absorption process for separating $CO_2$ from flue gas comprises amine based processes that have been used commercially for the removal of acid gas impurities ($CO_2$ and $H_2S$) from process gas streams. Alkanolamines can remove $CO_2$ from the flue gas stream by the exothermic reaction of $CO_2$ with the amine functionality of the alkanolamine. Different amines have different reaction rates with respect to the various acid gases. In addition, different amines vary in their equilibrium absorption characteristics for the various acid gases and have different sensitivities with respect to solvent stability and corrosion factors.

Alkanolamines can be divided into three groups: (1) primary amines whose members include monoethanol amine (MEA), diglycolamine (DGA); (2) secondary amines whose members include diethanolamine (DEA), di-isopropylamine (DIPA); and (3) tertiary amines whose members include triethanolamine (TEA) and methyl-diethanolamine (MDEA).

Figure 1:
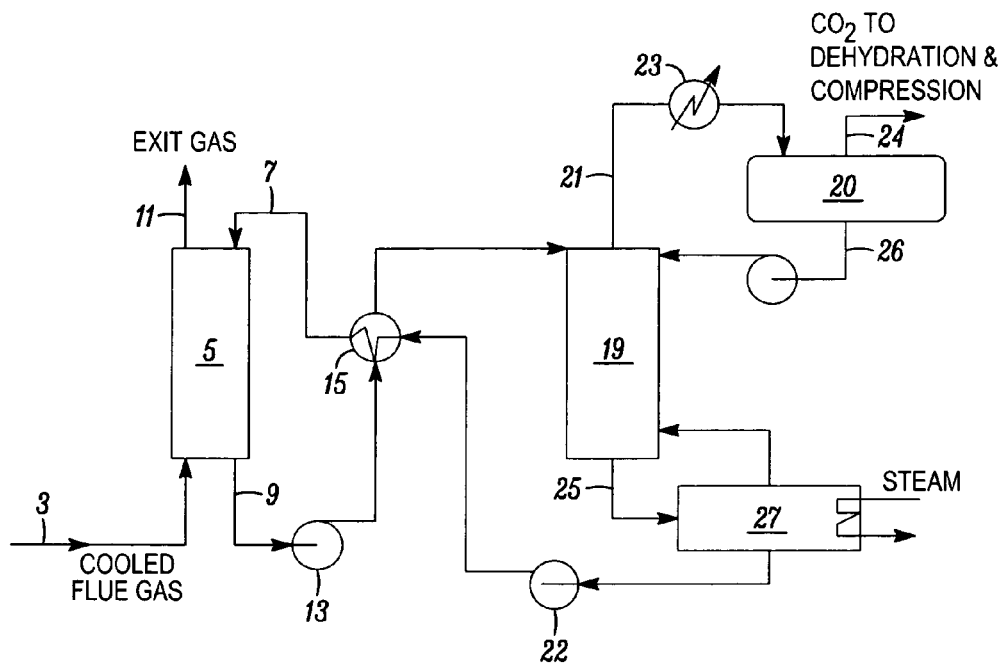
FIG. 1 is a schematic drawing showing a system for capturing and separating $CO_2$ gas from the flue gas of a coal burning power plant.

FIG. 1 shows an amine absorption system that can be used in connection with the process described herein. In the amine gas processing operation, the cooled flue gas flow 3 is preferably introduced into the absorber 5 (absorption tower), wherein the gas stream and liquid amine solution are preferably mixed by a countercurrent flow within absorber 5. Preferably, the gas 3 to be scrubbed enters the absorber 5 at the bottom, flows up, and leaves absorber 5 as an exit gas 11 (rich in $N_2$ and $O_2$) at the top, whereas, the solvent 7 enters the top of the absorber 5, flows down (contacting the gas), and emerges at the bottom 9. Dilution of the circulating amine with water is preferably accomplished to reduce the viscosity of the circulating fluid. The liquid amine solution 9 containing the absorbed gas is then pumped (using a $CO_2$ rich amine pump 13) through a lean/rich heat exchanger 15, where it is heated, and then the solution is fed into a stripper or regeneration unit 19 where the acid gases are liberated. Solvent regeneration can be carried out at low pressures to enhance desorption of $CO_2$ from the liquid.

The acid gas stream 21 containing the $CO_2$ preferably leaves the regeneration unit 19, wherein some amine solution is typically carried over from the regeneration step, wherein the amine solution is preferably recovered using a condenser 23. After passing through a reflux drum 20, the separated $CO_2$ gas 24 is then recovered and captured, such as for dehydration and compression, etc., wherein the remaining amine solution 26 is returned to regeneration unit 19. The expelled hot lean amine solution 25 is then passed through a reboiler 27, and pumped by lean amine pump 22 back to heat exchanger 15, where it is contacted with the rich amine solution from absorber 5, and from there the lean amine solution is returned back to absorber 5.

Among the primary amines, MEA has been the traditional solvent of choice for carbon dioxide absorption and acid gas removal. MEA is the least expensive of the alkanolamines and has the lowest molecular weight, so it possesses the highest theoretical absorption capacity for carbon dioxide, although this theoretical upper absorption capacity of MEA is not realized in practice due to corrosion problems. In addition, MEA has the highest vapor pressure of any of the alkanolamines and high solvent carryover can occur during carbon dioxide removal from the gas stream and regeneration step. To reduce solvent losses, a water wash of purified gas stream is usually required. In addition, MEA reacts irreversibly with minor impurities such as COS and $CS_2$ resulting in solvent degradation. Foaming of the absorbing liquid MEA due to the build-up of impurities can also be a concern.

There is considerable industrial experience with MEA and most systems at present use an aqueous solution with 15-25-wt % MEA, mainly due to corrosion issues, although corrosion inhibitors may be added which results in an increase in solution strength. In a commercial process, concentrations of MEA up to 30-wt % have been employed successfully to remove 80% to 90% of the carbon dioxide from the feed gas. The process has been used to treat flue gas, although some cooling and compression of the gas is required to operate the system. Another commercial process, which uses 20% MEA with inhibitors, is also offered for flue gas treatment.

For the current MEA absorber systems, the adsorption and desorption rates are reasonably high. However, the column packing represents a significant cost, and its energy consumption is also significant for flue gas treatment. In addition, the stripping temperature should not be too high. Otherwise, dimerization of carbamate may take place, deteriorating the sorption capability of MEA.

To date, commercial $CO_2$ capture plants typically use processes based on chemical absorption. The typical size of a commercial plant is relatively small (with a maximum of 800 tons/day) compared to that required for processing power plant flue gases (more than 5,000 tons/day).

The greatest limitation for $CO_2$ recovery from flue gas is its low pressure. $CO_2$ is absorbed much more easily into solvents at high pressure. The only commercially available solvents that can absorb a reasonable amount of $CO_2$ from dilute atmospheric pressure gas are primary and sterically hindered amines, such as MEA, DGA and KS-1, KS-2 and KS-3 series of solvents. These solvents can absorb $CO_2$ at low pressures because they have high reaction energies. This results in high-energy requirements to regenerate the rich solvent. However, energy costs may be reduced if the process can be fully integrated with a power plant where significant amount of low-grade heat may be available.

Flue gas entering the absorber at high temperatures can lead to solvent degradation and decreased absorption efficiency. Thus, the flue gas should be cooled to a water dew point of 50 degrees C., which can be accomplished in the desulfurization unit or with a direct contact water cooler.

Figure 2:
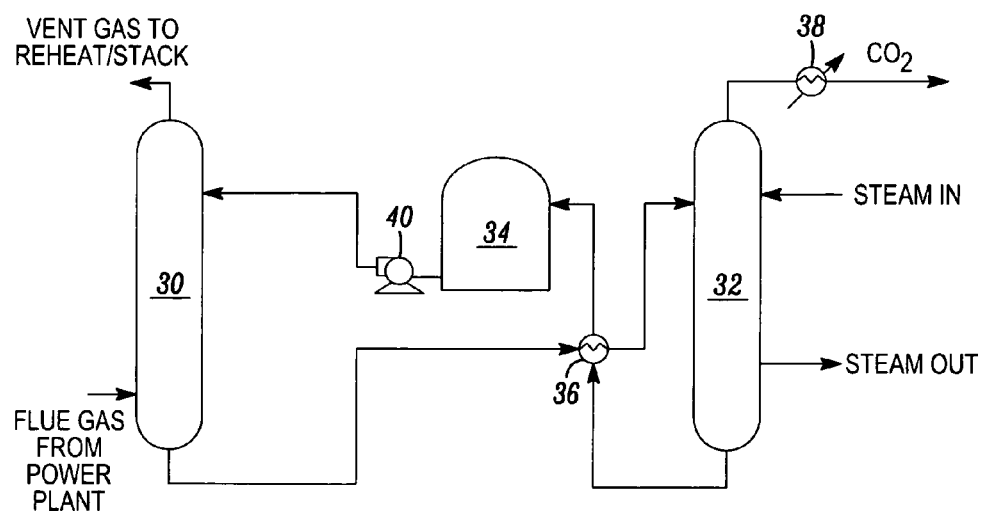
FIG. 2 is a schematic drawing showing an alternate system for capturing and separating $CO_2$ gas from the flue gas of a coal burning power plant.

Another system that can be used is shown in FIG. 2, which is based upon the use of amine solvents, principally monoethanolamine (MEA), developed originally to treat sour gas containing hydrogen sulfide. In this system, the MEA contacts the flue gas in an absorber 30 and takes up the $CO_2$, which is then subsequently steam-stripped in stripper 32 to release relatively pure carbon dioxide. The major components of this system include an absorber 30, regenerator (stripper) 32, solvent storage tank 34, heat exchanger 36, $CO_2$ condenser 38, and booster pump 40.

In use, the flue gas stream enters at the left side of the figure. The chemical solvent and $CO_2$ are exposed to one another in absorber 30 where they react chemically to form the loosely bonded intermediate compound. This compound, in liquid form, is then isolated and transferred to heat exchanger 36 and regenerator (also called stripper) 32 where it is heated, causing it to break down into separate streams of $CO_2$ and solvent. The $CO_2$ is then condensed in the condenser 38 and sent for further processing, such as dehydration and compression, before it is ready for storage or commercial use. The solvent stream produced in the regenerator 32 is then recycled back to the absorber 30 and the process repeats.

Note that storage tank 34 is installed in the solvent return line to allow for constant $CO_2$ removal under varying solvent recycling rates. Booster pump 40 also provides the pressure gradient required to transport the solvent. The heat exchanger 36 captures waste heat by transferring heat from the relatively hot fluid returning from the regenerator 32 to the relatively cool fluid flowing to the regenerator 32.

The chemical absorption process produces a relatively pure carbon dioxide stream, although one disadvantage of the process is that it consumes a significant amount of energy which is typically produced by the power plant.

Figure 3:
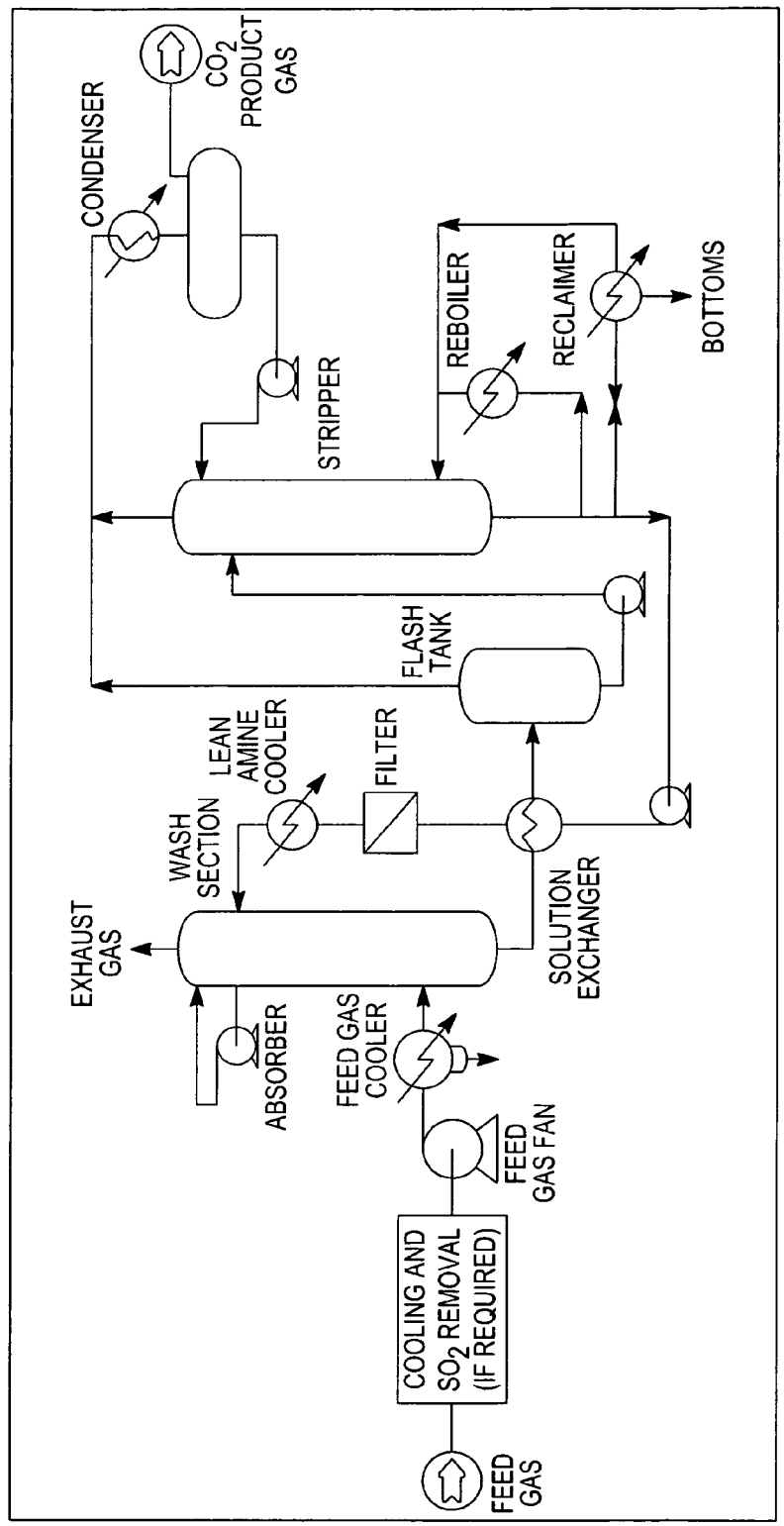
FIG. 3 is a schematic drawing showing another system for capturing and separating $CO_2$ gas from the flue gas of a coal burning power plant.

The chemical absorption process preferably uses pressure vessels, storage tanks, pumps, and heat exchangers similar to those used in many other industrial processes. The absorber module is preferably a gas/liquid contactor located within a carbon steel vessel or duct. This component can be similar to the wet scrubber modules retrofitted onto many coal-fired power plants to reduce sulfur emissions. During operation the absorber module pressure and temperature are approximately equal to those of the exhaust entering the module. Unlike the wet scrubber, there is no significant waste product generated in the absorber module. Another similar but more complicated system is shown in FIG. 3.

Another method of capturing $CO_2$ gas involves low temperature distillation (cryogenic separation) which is a process commonly used to liquefy and purify $CO_2$ from relatively high purity (>90%) sources. It typically involves cooling the gases to a very low temperature so that the $CO_2$ can be liquefied and separated.

Distillation generally has good economies of scale and is worth considering where there is a high concentration of $CO_2$ in the waste gas. The advantage of this method is that it produces a liquid $CO_2$ ready for transportation by pipeline or storage or other use as specified herein. The major disadvantages of this process are the amount of energy required to provide the refrigeration and the necessary removal of components that have freezing points above normal operating temperatures to avoid freezing and eventual blockage of the process equipment.

For post combustion flue gases, the waste streams typically contain water and other trace combustion by-products such as NOx and SOx several of which must be removed before the stream is reduced to a low temperature. Moreover, these by-products are usually generated near atmospheric pressure and tend to make cryogenic processes less economical than others in separating $CO_2$.

Figures 4, 5:
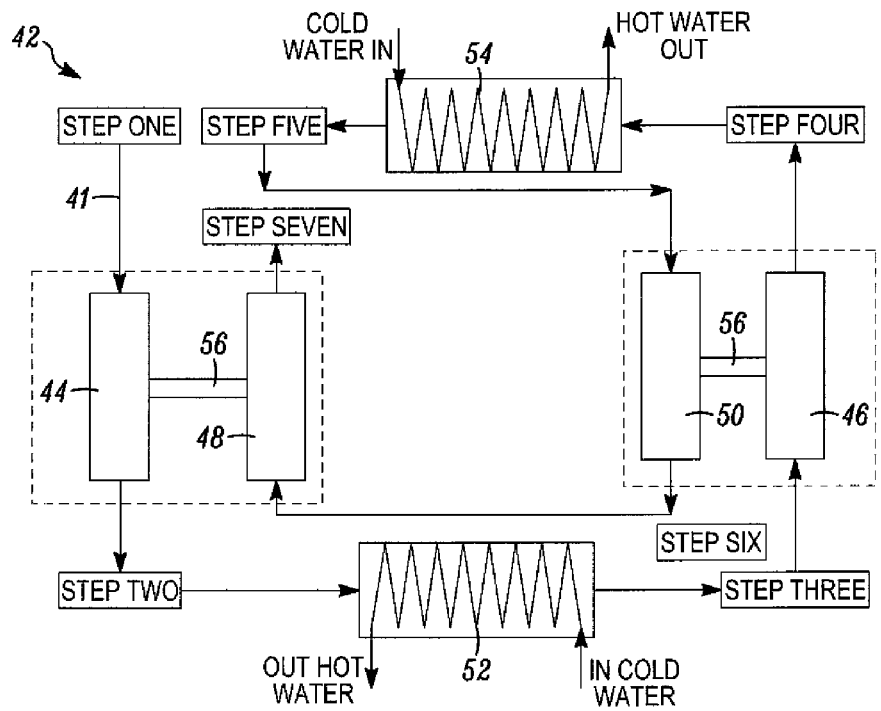
FIG. 4 is a schematic drawing showing a system for producing super chilled air using a turbo compressor and turbo expander set.
FIG. 5 is a chart showing the various pressure and temperature levels that occur using the apparatus shown in FIG. 4 to produce super chilled air.

FIG. 4 shows an example of a system 42 that can be used to produce super chilled air which in turn can be used to reduce the temperature of the $CO_2$ gas recovered through the previously described $CO_2$ capture process. FIG. 4 is a schematic drawing showing an embodiment that utilizes a two stage turbo compressor and two stage turbo expander set, wherein the turbo compressor and turbo expander are located on a common shaft, and multiple heat exchangers are provided.

As seen in FIG. 4, system 42 has a two stage turbo compressor 44, 46, and a two stage turbo expander 48, 50, along with two heat exchangers, 52, 54. It can be seen that the ambient air 41 (or previously compressed air) is introduced and first acted upon by first turbo compressor 44 which compresses the air, wherein a first heat exchanger 52 reduces the temperature thereof. The air that has been compressed is then acted upon by second turbo compressor 46 which compresses the air again, wherein a second heat exchanger 54 reduces the temperature again. These are followed by first and second turbo expanders 48, 50, which expand and release the compressed air to produce super chilled air.

In use, the input air 41 is preferably introduced at step one (shown in boxes) into first stage turbo compressor 44, wherein the air is initially compressed. At this point, the air can be compressed, such as to about 90 to 125 psia, which also increases the temperature of the air, such as from 70 degrees F. to about 135 degrees F., or more, as shown in FIG. 5. However, because first turbo compressor 44 is not fully efficient, the compressed air does not achieve a maximum temperature. For example, there may be losses (as shown in FIG. 5), wherein the output temperature may be less.

The compressed air that exits turbo compressor 44 at step two is then preferably passed through first heat exchanger 52, wherein the temperature of the compressed air is reduced. First heat exchanger 52 can be any conventional type that draws heat away from the compressed air. Preferably, the temperature of the compressed air can be substantially reduced such as down to room temperature before it is passed onto second stage turbo compressor 46 at step three. Although the pressure of the compressed air preferably remains about the same, some minimal pressure drop may be caused by the flow of air through the interior of heat exchanger 52.

Next, the compressed air that exits first heat exchanger 52 is preferably introduced at step three into second stage turbo compressor 46, wherein the air is compressed further. For example, at this point, the air is preferably compressed to an even higher pressure, i.e., about 220 psia or more, which also increases the temperature of the air, as shown in FIG. 5. However, because second turbo compressor 46 is not fully efficient, the compressed air does not achieve maximum temperature.

The compressed air that exits second stage turbo compressor 46 at step four is then preferably passed through second heat exchanger 54, wherein the temperature of the compressed heated air is reduced again. Second heat exchanger 54 can be any conventional type that draws heat away from the air. The compressed air that exits second heat exchanger 54 at step five is then introduced into first stage turbo expander 48, wherein the compressed air is released and expanded. For example, at this point, the air which has been compressed to about 220 psia can be released until the pressure is reduced to about 55 psia, wherein the temperature can be significantly reduced, such as shown in FIG. 5.

The air that exits first stage turbo expander 48 at step six is then introduced into second stage turbo expander 50, wherein the air is released and expanded again, to step seven. For example, at this point, the air which was at 55 psia can be released until the pressure is reduced down to ambient pressure, and the temperature can be reduced further, such as down to minus 170 degrees F. to minus 185 degrees F., although due to losses, the actual output temperature may be higher.

It should be noted that as air is passed through system 42 as described above, and as turbo expanders 48 and 50 begin to spin and operate to release the compressed air, additional work is performed which eventually results in the system reaching a steady state condition of operation. The basic operation of device 42 starts with air being introduced into first stage turbo compressor 44, and then, into second stage turbo compressor 46, and by the time the compressed air is released, because turbo expander 48 and turbo compressor 44 are located on the same shaft, and turbo expander 50 and turbo compressor 46 are located on the same shaft, when turbo expanders 48, 50 begin to rotate, turbo compressors 44, 46 also begin to rotate. As this occurs, all four begin rotating in unison. A common shaft 56 ("free spindle") that extends between turbo compressors 44, 46 and turbo expanders 48, 50, respectively, enables the torque (mechanical work) generated by turbo expanders 48, 50 to drive turbo compressors 44, 46, until a steady state condition of operation is achieved.

In this system, electricity does not need to be generated, although it can be as a by-product of producing chilled air. This is only one of the systems that can be used in connection with the invention contemplated—others can be used as well.

Figure 6:
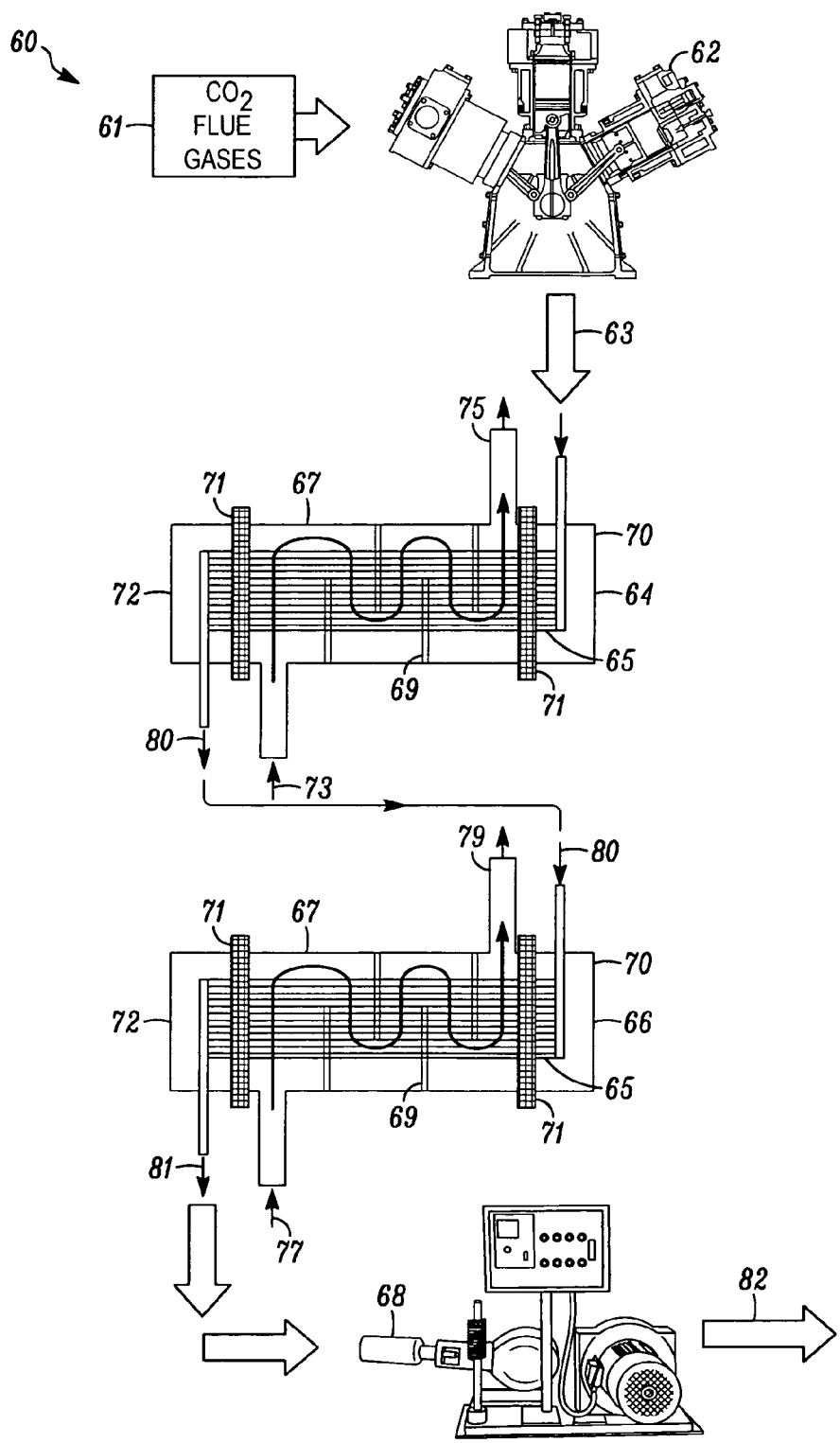
FIG. 6 is a schematic drawing showing a system for pressurizing and chilling the $CO_2$ gas captured from the flue gas of a coal burning power plant, wherein two heat exchangers are shown, one using cold water, and the other using chilled air produced by the system shown in FIG. 4, along with a cryogenic pump.

FIG. 6 shows a system 60 used to pressurize, chill and liquefy the $CO_2$ gas captured from the flue gas to form a pressurized cold liquid $CO_2$, using cold water and the super-chilled air produced by device 42. System 60 preferably comprises a compressor 62, a first heat exchanger 64, second heat exchanger 66, and cryogenic pump 68. The present method involves exposing the gaseous $CO_2$ to the high mass flow of super chilled air to form liquid carbon dioxide ($LCO_2$) using system 60.

If the $GCO_2$ is fed directly to a heat exchanger wherein it is chilled at atmospheric pressure, the $GCO_2$ could form "dry ice". Thus, it is first desirable to pressurize the $GCO_2$ prior to chilling it. For example, in the first step, the room temperature $GCO_2$ at ambient 1 atmospheric pressure is preferably pressurized, such as to $GCO_2$ at 17 atmospheres (250 psia), using compressor 62. But because the compression process warms the compressor body, the compression process also produces heated $GCO_2$ that must be cooled, which can be accomplished by using a water and $CO_2$ heat exchanger 64—slightly pressurized water is passed through the shell 67 of the heat exchanger 64 and the highly pressurized $GCO_2$ is passed through the multitude of small diameter tubes 65. The small diameter of tubes 65 permits containment of the high pressure $GCO_2$, and the large quantity of tubes provides the necessary surface area for the heat transfer to occur between the water and $GCO_2$. Baffles 69 help increase the path length of the coolant water in the fixed length of the heat exchanger shell 67. Through this process, there is a pressure drop in the $GCO_2$ caused by the flow of the $GCO_2$ through the tubes over a long path length.

The $GCO_2$ is next passed through the second heat exchanger 66 wherein the super-chilled air is preferably passed through the shell 67 of the heat exchanger 66, while the high pressure $GCO_2$ is passed through the small diameter tubes 65 over a long path length. It is in these heat exchanger tubes 65 that the $GCO_2$ forms $LCO_2$. The air exiting shell 67 is at sufficiently low temperature to be used elsewhere in a nearby facility, i.e., the cold air can be used, for example, in an HVAC system or in a more complex configuration to generate more electricity from a turbine-driven generator set (such as a GENSET) during the hot summer months. The air exiting the shell is preferably at sufficiently low temperature to alternatively be used elsewhere in a nearby facility. For example, it can replace the cryogenic device in the PETROGAS fractionation and pressurization device for natural gas prior to its further transmission in a pipeline or refrigeration truck. This process preferably occurs after the $LCO_2$ sequestration has already been completed.

Compressor 62 can be any conventional type such as made by Ingersoll Rand to compress the $CO_2$ gas 61 to a predetermined pressure, such as 100 to 250 psia, which in turn, causes the $CO_2$ gas to heat up. The heated and pressurized $CO_2$ gas 63 is then preferably fed into first heat exchanger 64, which preferably comprises a straight tube, counter-flow type, with straight tubes 65 supported by tube sheets 71, wherein gas 63 can be introduced into tubes 65. Tubes 65 are preferably in a bundle and extended from one end 70, through shell 67 and across baffles 69, such that they exit at or near the opposite end 72. In this heat exchanger 64, cold water 73 is preferably introduced into shell 67 and circulated, such that the contact between the cold water and outer surface of tubes 65 draws heat away from the $CO_2$ gas passing through the inside of tubes 65. Cold water 73 preferably flows into shell 67 at or near end 72 and exits as hot water 75 at or near end 70. This way, it travels in a direction opposite the flow of $CO_2$ gas 63 through tubes 65, i.e., heated gas 63 enters at or near end 70 and exits at or near end 72 as relatively cool $CO_2$ gas 80. The pressure of $CO_2$ gas, both at 63 and 80, preferably remains substantially the same, although there is a slight pressure drop due to the passage of the air through tubes 65.

The cooled and pressurized $CO_2$ gas 80 is then fed into second heat exchanger 66, which, like heat exchanger 64, preferably comprises a straight tube, counter-flow type, with straight tubes 65 supported by tube sheets 71. Tubes 65 are preferably in a bundle and extended from or near one end 70, and through shell 67 and across baffles 69, such that they exit at or near opposite end 72. In this heat exchanger, super chilled air 77 from system 42, rather than cold water, is preferably introduced into shell 67 and circulated through the inside of heat exchanger 66, such that the contact between the cold air and the outer surface of tubes 65 helps to draw heat away from the $CO_2$ gas 80 passing through the inside of tubes 65. Super chilled air 77 preferably flows into shell 67 at or near end 72 and after heat is exchanged exits as warm air 79 at or near opposite end 70, such that it travels in a direction opposite the flow of the $CO_2$ gas 80, which enters tubes 65 at or near end 70 and exits as cryogenic liquid $CO_2$ 81 at or near end 72.

The temperature of the cold liquid $CO_2$ 81 that is discharged for purposes of the present invention is preferably about minus 60 degrees F. or below, although various temperatures are permissible, as will be discussed. And because there is a phase change from a gas to a liquid within tubes 65, and the gas passes through tubes 65, from one end 70 to the other 72, the pressure of the $CO_2$ gas within second heat exchanger 66 will tend to drop slightly by the time it becomes a cold liquid $CO_2$.

The cold liquid $CO_2$ 81 is then fed into cryogenic pump 68 which increases the pressure of the cold $LCO_2$, such as up to 315 ATM, or close to 5,000 psia. A typical cryogenic pump 68 is preferably able to deliver the required pressure for the discharged $LCO_2$ shown at 82. If one needs 5,000 GPM, it may be necessary to use 25 pumps. However, there are larger volumetric flow cryogenic pumps that can be used. Pressurizing the $CO_2$ also heats it up, resulting in warmer pressurized $LCO_2$.

The goal here is to keep the cold $LCO_2$ cold enough and under enough pressure to keep the $LCO_2$ in liquid form, and prevent it from vaporizing into a gas prematurely when injected into the rock formation. For example, if the underground rock is warmer than the $LCO_2$, the pressure within the formation may have to be maintained above a certain minimum, or the initial starting temperature of the $LCO_2$ may have to be reduced, to ensure that the $LCO_2$ remains a liquid when injected. Likewise, if the pressure of the liquid $LCO_2$ within the rock formation drops (because the $LCO_2$ is seeping into the cracks), the $LCO_2$ may have to start out colder, or the initial pressure may have to be increased, in order to prevent the liquid from vaporizing prematurely. For these reasons, the characteristics of each formation should be taken into account when determining the initial temperature and pressure of the $LCO_2$ being injected.

Figures 7, 8:
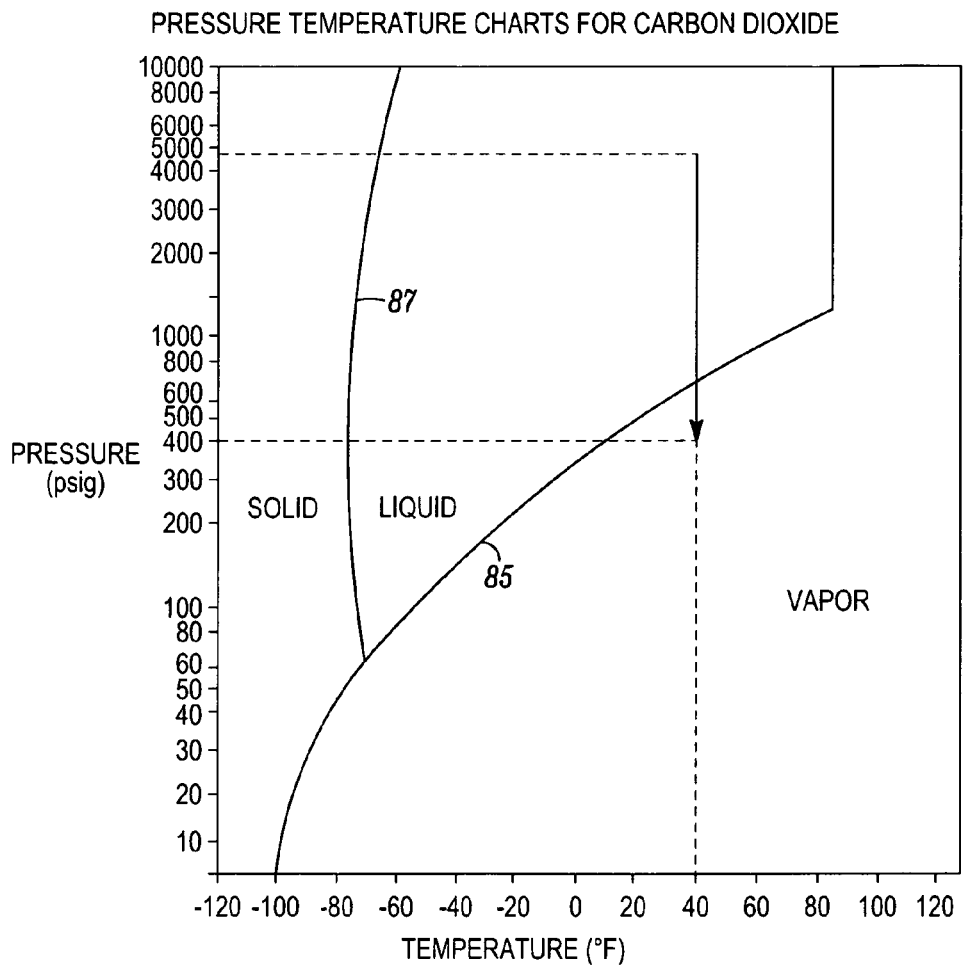
FIG. 7 is a phase chart for carbon dioxide in vapor, liquid and solid phases, showing the temperature and pressure amounts that are required for those phases.
FIG. 8 is a diagram showing the pressure and temperature of $CO_2$ at various stages within the method.

In this case, the temperature and pressure of the $LCO_2$ starting out should cause it to maintain its liquid state, as shown in the phase chart in FIG. 7—the temperature and pressure have to follow the phase change line 85. For example, if $LCO_2$ is reduced to minus 60 degrees F., the pressure will have to be increased to about 100 psig for the gas to change to a liquid. Likewise, if $GCO_2$ is reduced to only about 0 degrees F., the pressure will have to be increased to about 400 psig or more, for the gas to change to a liquid. On the other hand, cooling the $GCO_2$ down to below minus 100 degrees F. can cause the $CO_2$ to become a solid. The $CO_2$ will also become a solid at around minus 70 degrees F., provided the pressure is high enough, as shown by line 87 in FIG. 7.

In gas shale, natural gas occurs as free gas in the intergranular and fracture porosity and is adsorbed on clay and kerogen surfaces, very similar to the way methane is stored within coal beds. It has been demonstrated in gassy coals that is preferentially adsorbed, displacing methane at a ratio of two for one or more. Black shale reservoirs react similarly, desorbing methane in the presence of adsorbing $CO_2$. If this is the case, black shale serves as an excellent sink for $CO_2$ and has the added benefit of serving to enhance natural-gas production.

Adsorption is the adhesion of atoms, ions, bio-molecules or molecules of gas, liquid, or dissolved solids to a surface. This process creates a film of the adsorbate (the molecules or atoms being accumulated) on the surface of the adsorbent. It differs from absorption, in which a fluid permeates or is dissolved by a liquid or solid. The term sorption encompasses both processes, while desorption is the reverse of adsorption.

Similar to surface tension, adsorption is a consequence of surface energy. In a bulk material, all the bonding requirements (be they ionic, covalent, or metallic) of the constituent atoms of the material are filled by other atoms in the material. However, atoms on the surface of the adsorbent are not wholly surrounded by other adsorbent atoms and therefore can attract adsorbates.

The adsorption data for carbon dioxide on gas shale and on coal has been collected over a large range of pressures, but not often at very low temperatures. The collected data conforms to the Langmuir Isotherms for gaseous carbon dioxide ($GCO_2$). The adsorption data at cryogenic temperatures has been collected at sub-atmospheric pressure so that the $CO_2$ is still in the gaseous state ($GCO_2$). In all cases, the gas adsorption is enhanced as the temperature is reduced or the pressure is increased or a combination of the two. Adsorption of liquids also occurs but is not based on the theory developed by Langmuir decades ago. Cryogenic liquid adsorbates have been more recently applied to coal adsorbents and shale adsorbents.

Figure 9:
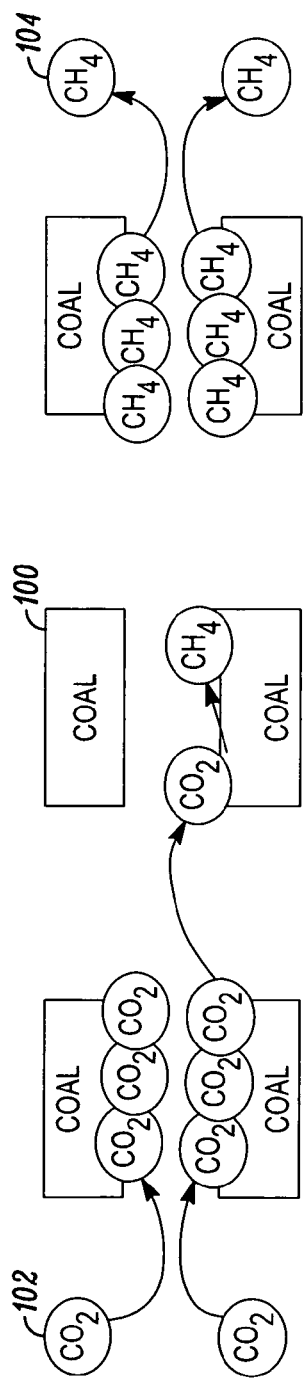
FIG. 9 is a schematic drawing showing $CO_2$ being adsorbed onto coal and $CH_4$ being desorbed.

If the underground coal or gas shale is exposed to $CO_2$ while it is holding the adsorbed natural gas (mostly methane, $CH_4$), it has a greater affinity for the $CO_2$ than the natural gas. Thus, the natural gas is released and the $CO_2$ is adsorbed. This is shown in FIG. 9 which depicts the coal 100 having a higher adsorption affinity to gaseous $CO_2$ molecules 102 at relatively high pressures (such as 200 to 500 psig or more) than for gaseous $CH_4$ molecules 104. In a given coal bed, for example, as the coal 100 is exposed to $CO_2$ molecules under pressure, because coal has a greater affinity for the $CO_2$ molecules than the $CH_4$ molecules, the $CH_4$ molecules 104 are naturally desorbed, thereby allowing the $CO_2$ molecules 102 to be adsorbed. This results in advantageously releasing the $CH_4$ molecules 104 so that natural gas can be recovered, while at the same time, adsorbing the $CO_2$ molecules 102 so that they can be sequestered in the coal bed. The same process occurs in gas shale.

Figure 10:
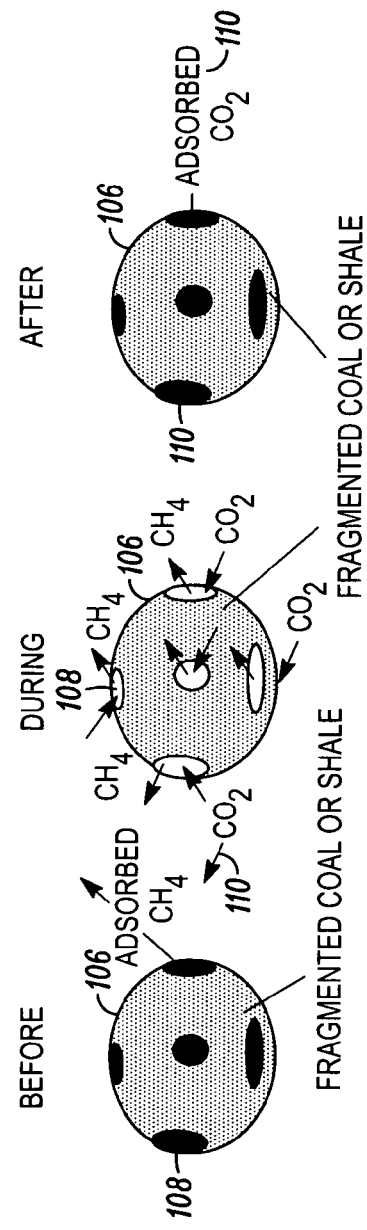
FIG. 10 is a schematic drawing showing the before, during and after steps relating to how $CO_2$ is adsorbed and $CH_4$ is desorbed and released from coal or shale.

FIG. 10 shows how the fragmented coal or gas shale fragments or pieces 106 are before, during and after the adsorption process. On the left hand side, before the process begins, a fragment of coal or gas shale 106 is shown with $CH_4$ 108 adsorbed onto its surface, which occurs over a period of time within the underground formation. Then, as shown in the middle drawing, during adsorption, the $CO_2$ molecules 110 have a greater affinity for the coal or gas shale fragments 106, and therefore, are adsorbed onto the fragments, while at the same time, the $CH_4$ molecules 108 are desorbed and released as natural gas. After the adsorption process, as shown in the right hand drawing, the adsorbed $CO_2$ molecules 110 remain on the surface of the fragments 106, wherein, the $CH_4$ molecules 108 are released and can be recovered.

The rate at which $CO_2$ is adsorbed onto and $CH_4$ is desorbed from the fragments is determined based on the temperature and pressure levels and other factors existing in the formation. In this respect, the first mathematical fit to an isotherm was likely to have been published by Freundlich and Küster (1894) and is a purely empirical formula for gaseous adsorbates as follows:

$$\frac{x}{m} = kP^{\frac{1}{n}}$$

where x is the quantity adsorbed, m is the mass of the adsorbent, P is the pressure of adsorbate and k and n are empirical constants for each adsorbent-adsorbate pair at a given temperature. The function has an asymptotic maximum as pressure increases without bound. As the temperature decreases, the constants k and n change to reflect the empirical observation that the quantity adsorbed rises more quickly so that higher pressures are not required to saturate the surface.

The Langmuir equation or Langmuir isotherm or Langmuir adsorption equation or Hill-Langmuir equation relates to the coverage or adsorption of molecules on a solid surface to gas pressure or concentration of a medium above the solid surface at a fixed temperature. The following equation was developed by Irving Langmuir in 1916:

$$\theta = \frac{\alpha \cdot P}{1 + \alpha \cdot P}$$

where $\theta$ or theta is the fractional coverage of the surface, P is the gas pressure or concentration, and $\alpha$ alpha is a constant. The constant $\alpha$ is the Langmuir adsorption constant and increases with an increase in the binding energy of adsorption and with a decrease in temperature. Thus, the extent of adsorption depends on physical parameters such as temperature, pressure, concentration in the bulk phase, and the surface area of the adsorbent, as well as on chemical parameters such as the elemental nature of the adsorbate and adsorbent. Low temperatures, high pressures, high surface areas, and highly reactive adsorbates or adsorbents generally favor adsorption. Cryo-adsorption is a method used for hydrogen storage where gaseous hydrogen at cryogenic temperatures (150-60 K) is physically adsorbed on porous material, mostly activated carbon. The achievable storage density is between liquid hydrogen ($LH_2$) storage systems and compressed hydrogen ($CGH_2$) storage systems.

One of the objectives of the present method and apparatus is to enable the coal or gas shale formation to be exposed to $CO_2$ under the right conditions within the joints, cracks, fissures and fractures of a rock formation, so that the $CO_2$ molecules will be adsorbed onto the fragments, whereas, the $CH_4$ molecules will be desorbed and released, such that the released natural gas can then migrate toward the nearby well bore along an imposed pressure gradient and buoy itself upward through the pipe to the surface. As a consequence, the $CO_2$ can be sequestered and stored in the formation.

Figure 11:
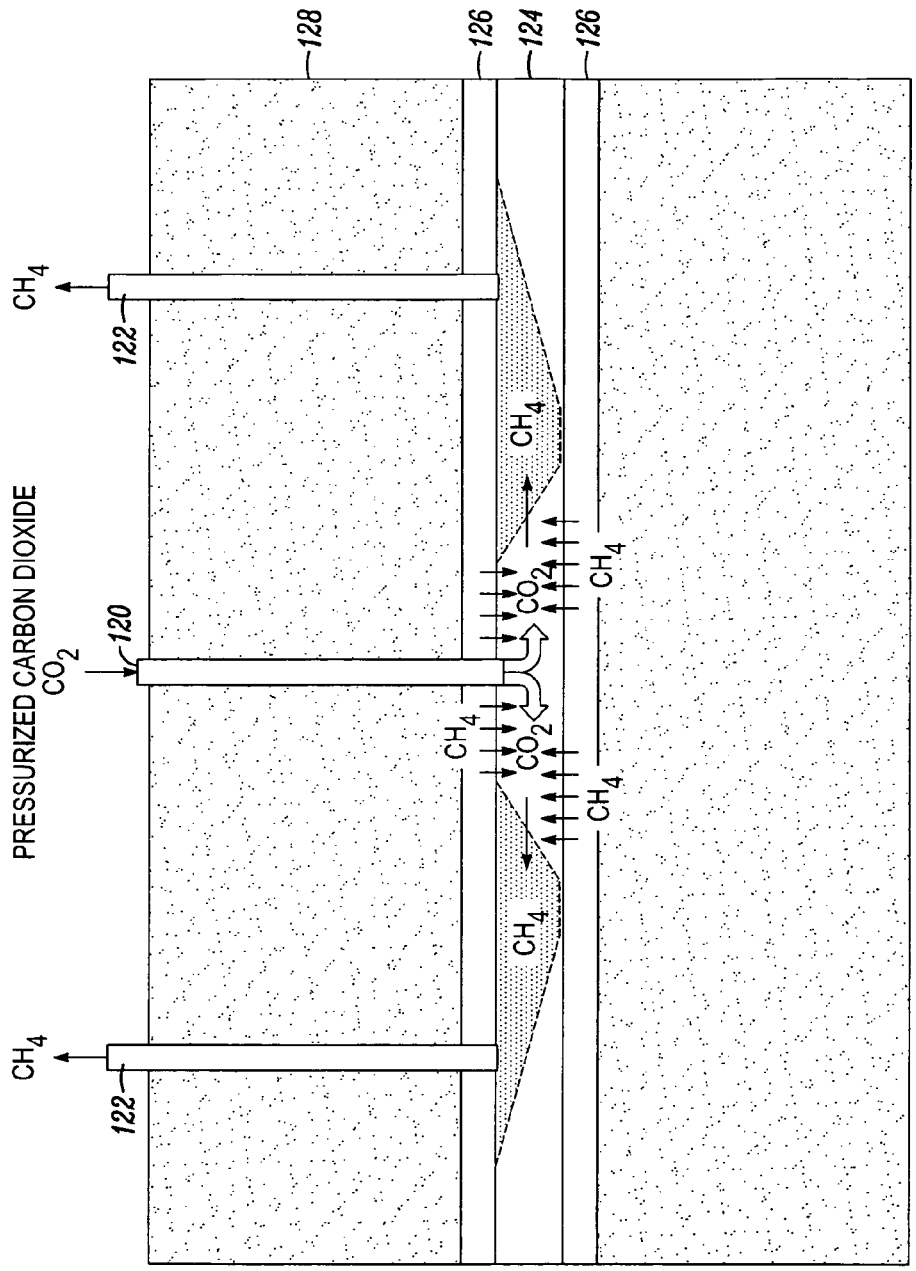
FIG. 11 shows a cross section of a typical abandoned coal mine showing how the input and output pipes are positioned within the underground strata.
Figure 12:
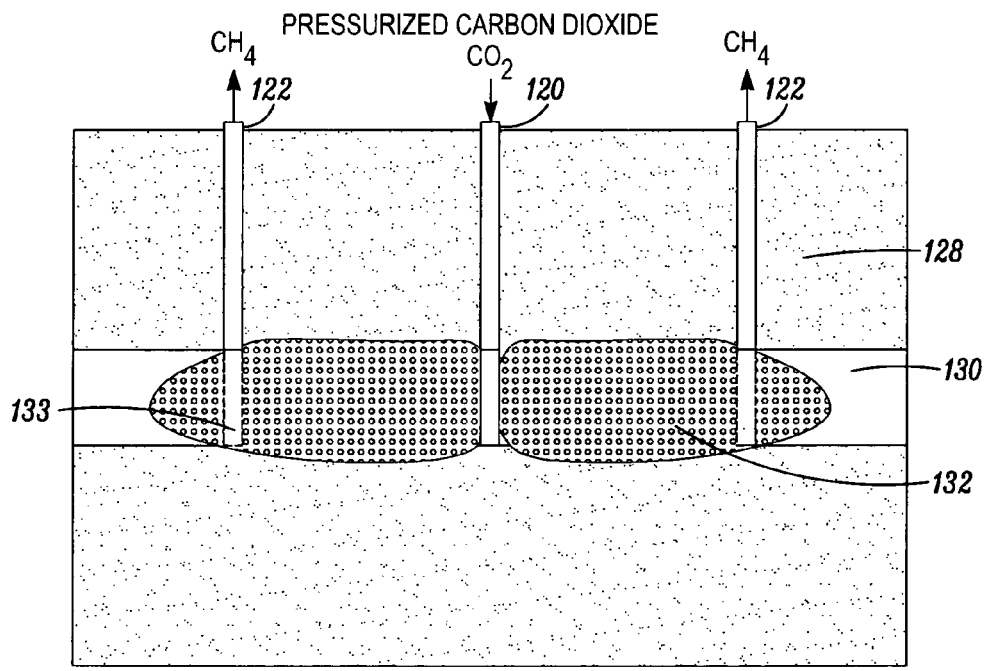
FIG. 12 shows a cross section of a typical coal or gas shale site showing how the input and output pipes are positioned within the underground strata or layer.
Figure 13:
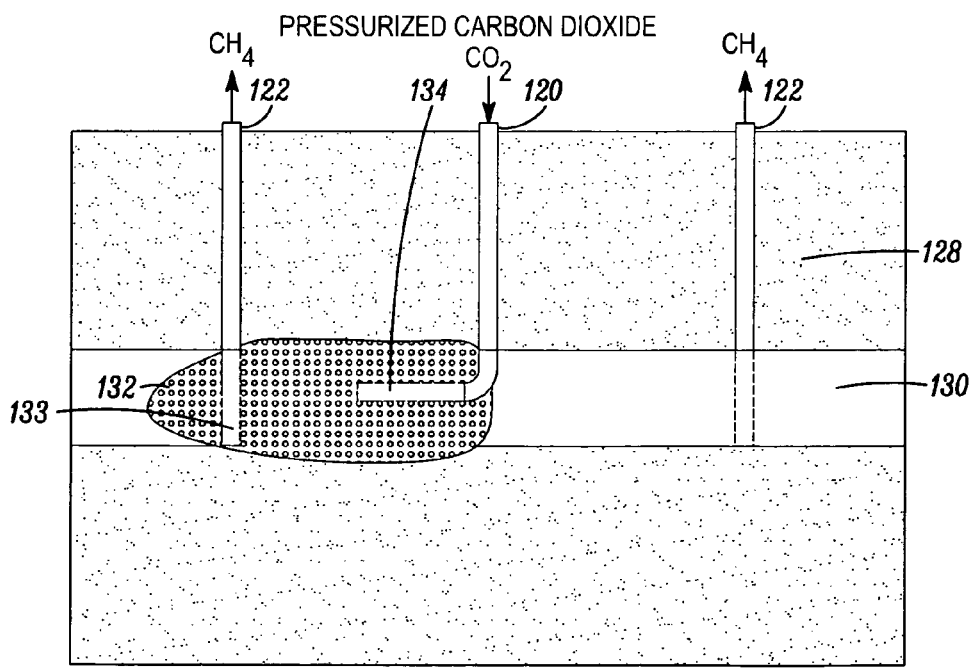
FIG. 13 shows a cross section of a typical coal or gas shale site showing how the input and output pipes are positioned within the underground strata or layer, wherein the lower end of the input pipe is extended horizontally.

The proposed approach to injecting $LCO_2$ into the underground formation is to use an array of input or injection pipes 120 that extend down through the geological layers of rock until the targeted coal layer or gas shale layer is reached, as diagrammatically shown in FIGS. 11, 12 and 13. The u-portion portion of the input pipes, 120, that extend through the underground layers is preferably solid, whereas, the bottoms of the pipes 133 that extend down through the targeted coal or shale strata is preferably perforated.

Figure 24:
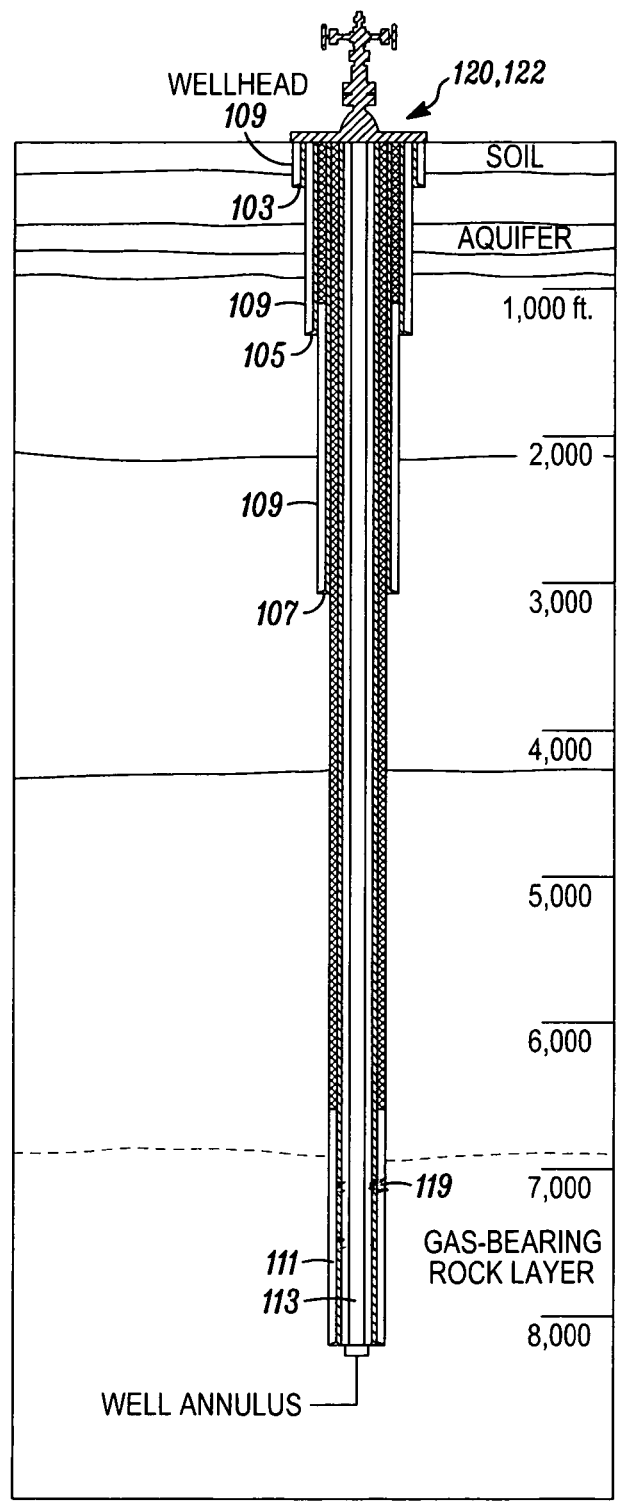
FIG. 24 shows a cross section of a typical pipe extending down into the gas bearing strata through the soil and layers above.

An example of the various layers of tubing that can be extended into the strata as part of the pipe 120 is shown in FIG. 24. For example, at the top, there can be a conductor casing 103, followed by a surface casing 105, followed by an intermediate casing 107, with concrete 109 formed in between each layer, wherein these layers can be provided, depending on the type and nature of rock formation that is encountered. The perforations 119 can then be located at or near the bottom, in the production casing 111 and/or production tubing 113, which preferably extend down within the coal or gas shale strata, which can be below layers of rock and mud.

The input pipe 120 is preferably made of steel or other strong material and can be circular and of sufficient internal diameter and thickness depending on the length and pressures that are expected to be encountered. The perforations 119 can also be circular and of sufficient size to enable a sufficient flow of fluid into and out of the targeted rock formation, such as a gas bearing rock layer 117. For example, each perforation can be one inch in diameter, wherein four of them can be formed in the shape of a ring at a predetermined height along the length of the pipe. In this respect, the first ring of holes is preferably located close to the top of the targeted production layer or strata, such as about fifteen feet below the upper surface of the layer. Then, additional rings of holes can be extended down along the pipe 120, such as about once every fifteen feet or so, until the last ring of holes can be located at the bottom of the production hole.

The total cross sectional flow area of the perforations 119 in the pipe is preferably designed to match the cross sectional flow area of the pipe itself. Thus, the design of each pipe will depend on the internal diameter of the pipe, the height or thickness of the rock formation it is being used in, and the size or diameter of each perforation in the pipe. For example, consider a 250 feet thickness of shale where the internal diameter of the pipe is eight inches, and the perforations are one inch in diameter (four perforations at each level). In such case, the optimal design might be 16 rows or rings of four holes each (around the circumference), where the top row will be 7 feet from the nearest layer interface, and each intermediate row will be 14.7 feet apart from the other. Also consider a 50 feet thickness of shale with the same internal diameter of pipe, and the same diameter perforations, wherein, in such case, the optimal design might be 16 rows of four holes, where the top row will be 1.5 feet from the nearest interface, and each intermediate row will only be 3 feet apart. This allows for the maximum rate of flow through the perforations given the size and diameter of the pipe.

To allow for proper recovery and release of gases that are produced within the formation, similar arrays of output pipes 122, that extend down into the same geological layers are preferably provided. Similar to the input pipes 120, the upper portion of the output or recovery pipes 122 are preferably solid with various layers of pipes and concrete, wherein the bottoms of the pipes that extend down into the targeted coal or shale formation is preferably perforated 119. These pipes 122 can be substantially similar to the input pipes 120, i.e., they can be made of steel or other strong material and can be circular and of sufficient diameter and thickness depending on the length and pressures that are expected. The perforations 119 can also be circular and of sufficient size and number to enable a sufficient flow of fluid into the pipe from the rock formation.

Figure 15:
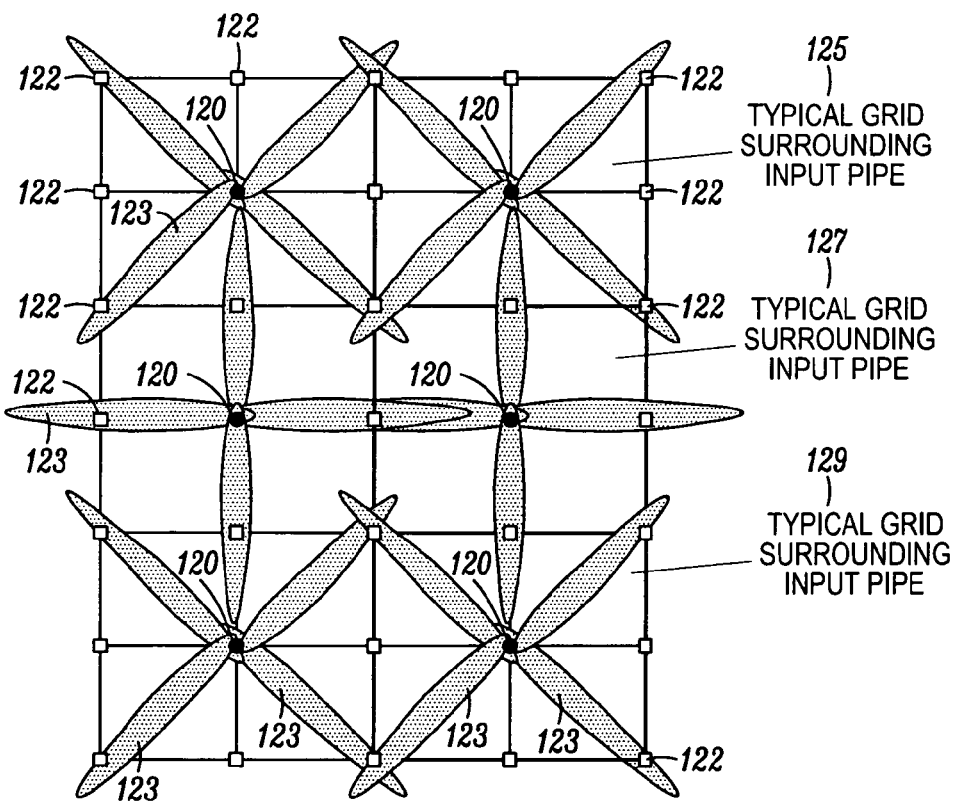
FIG. 15 shows in plan view a typical coal or gas shale site showing how the arrays of input and output pipes are located relative to each other, and how the narrow voids created by the pressurized liquid $CO_2$ injections from each perforation in each input pipe are oriented, wherein the different grids are offset to allow the voids to intermesh with each other, to allow more area to be covered by each input pipe.
Figure 16:
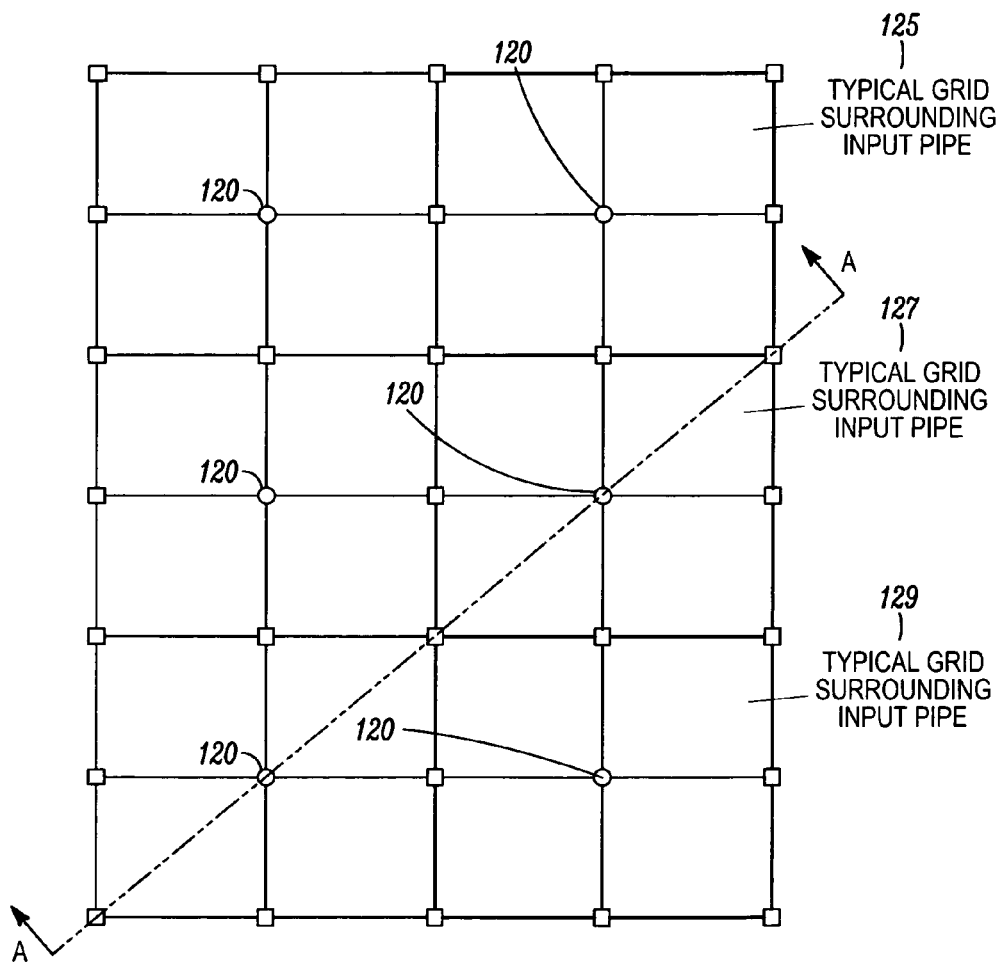
FIG. 16 shows another plan view of the coal or gas shale site shown in FIG. 15.
Figure 17:
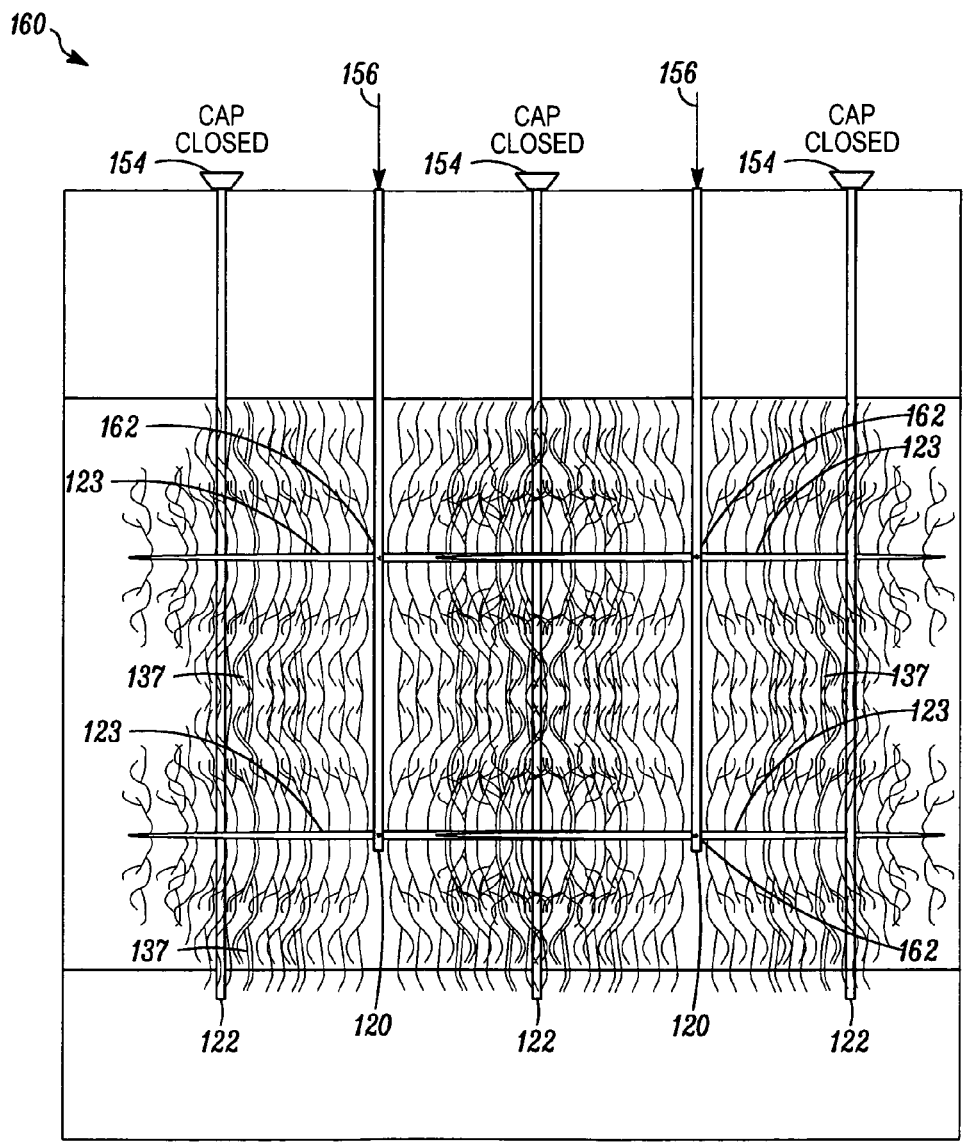
FIG. 17 shows a cross section of a typical coal or gas shale site showing how the input and output pipes are positioned within the underground strata, wherein the pressurized cold liquid $CO_2$ injected through each perforation within each input pipe forms horizontally directed voids that extend laterally through the formation, as well as extended web-like fractures extending above and below the voids throughout the formation.
Figure 18:
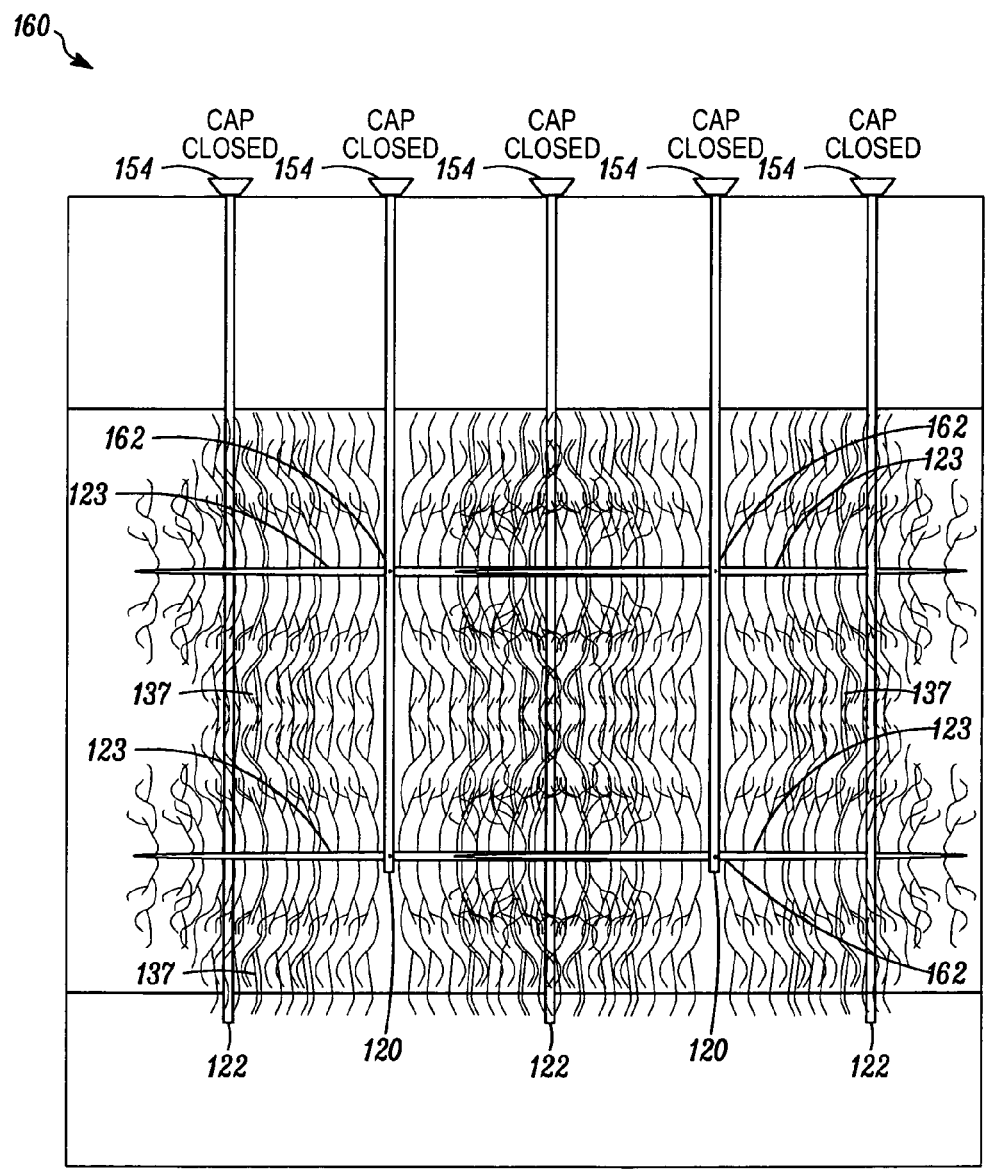
FIG. 18 shows a similar cross section of the site shown in FIG. 17, but in this drawing, the pipes are closed at the top.
Figure 19:
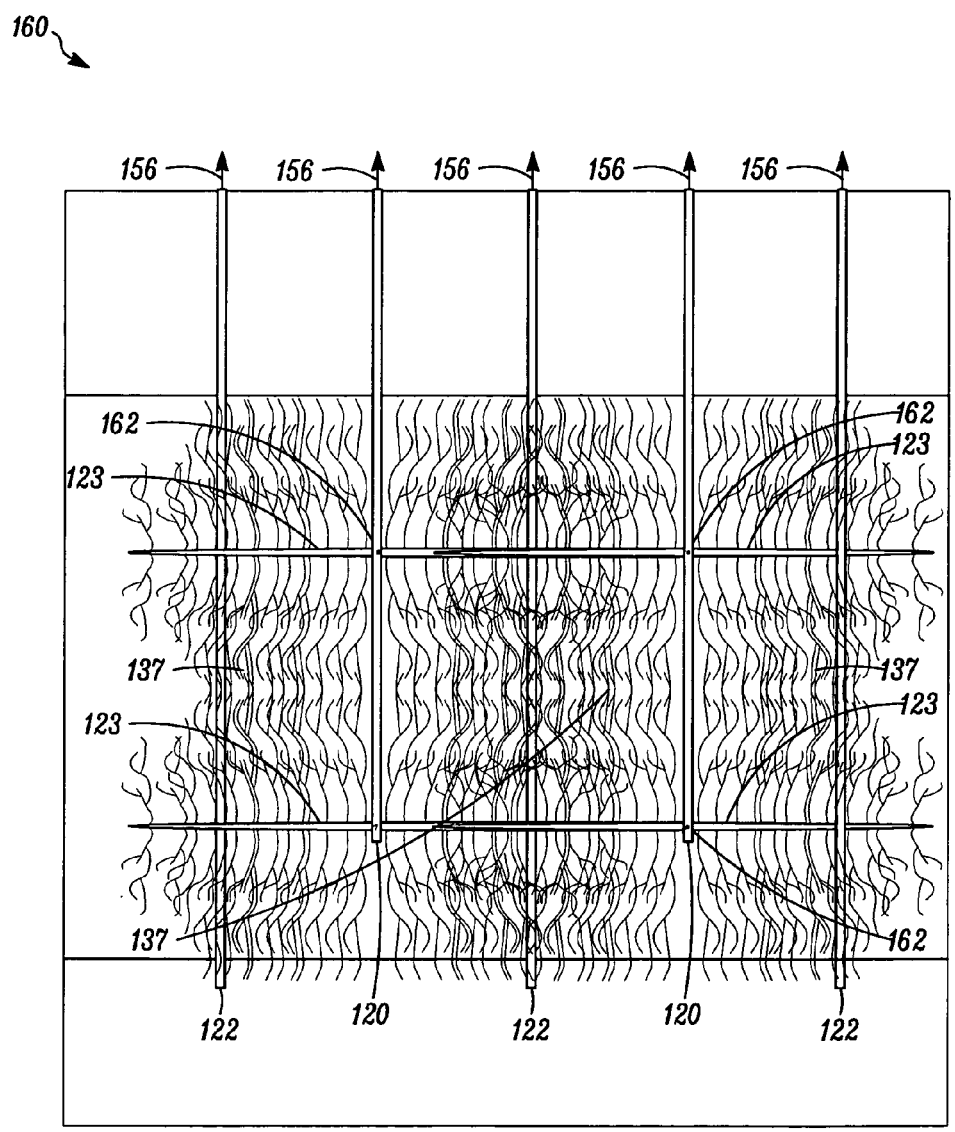
FIG. 19 shows a similar cross section of the site shown in FIG. 17, but in this drawing, the pipes are open.

Preferably, there are several output pipes 122 for each input pipe 120 within a particular geographical area, such as concentrically surrounding the input pipe 120, as shown in FIGS. 15 and 16. That is, for every input pipe 120, there are preferably several output pipes 122, such as four to eight, in the form of a grid to enable a sufficient amount of gas to be recovered using a single input pipe 120. Because the goal is to release the lower density gases and recover them from a large geographical area, there is preferably a need for more output pipes 122, than input pipes 120. Each output pipe 122 is preferably extended deeper into the strata than the input pipes 120, as shown in FIGS. 17 to 19. This enables gases formed within the deeper areas that are below the input pipe 120 to be readily recovered.

Preferably, input pipes 120 are spaced apart a sufficient distance relative to each other to enable the natural gases formed within the covered geographical area to be efficiently recovered. This can be based, for example, on the expected distance that the fracturing method can reach, wherein the greater the reach, the more distance can be placed between adjacent input pipes 120. That is, insofar as the fracturing method can effectively reach relatively great distances, the number of input pipes 120 within the same geographical area can be reduced. For example, in one embodiment, the distance between input pipe 120 and each of the surrounding four output pipes 122, as shown in FIG. 15, can be about 1,000 feet or more, and thus, the distance between adjacent input pipes 120 can be even greater, such as every 2,000 feet or more. Relative to one input pipe 120, the other four surrounding output pipes 122 are preferably used as receivers for gas recovery, wherein this layout can continue throughout the acreage, with the avoidance of interference between the adjacent sets of one input 120 and four output pipes 122 each.

FIG. 15 shows an example of an array of pipes that can be used on the surface of a geological formation, wherein input pipes 120 and output pipes 122 are laid out in grid fashion, with the narrow void or fracture areas created by the high pressure injection jets of $LCO_2$ emanating from the perforations shown by the fan-shaped configuration 123. It should be noted that because the perforations typically comprise four holes equidistance apart forming a ring of holes at a predetermined level or height, each void or fracture 123 formed by each perforation will form a pattern of voids 123 that are at right angles relative to each other.

FIG. 15 also shows a pattern for rubblization by orienting the perforation holes of the input pipes 120 so that the narrow voids 123 they create will mesh with each other. That is, as shown in FIG. 15, one row or grid 125 of input pipes 120 can be oriented with perforations (and therefore voids 123) extended at forty-five degrees relative to the grid pattern, whereas, the adjacent row or grid 127 can be oriented with the perforations (and voids 123) extending in the same direction as the grid pattern, wherein the perforations on one row 125 are at forty-five degrees relative to those of the adjacent row 127. The same is true between grids 127 and 129. This way, by aiming the injection of $LCO_2$ in one row in one direction to create voids 123, and aiming the injection in another row in a different direction, better coverage is possible using fewer input pipes. It can also be seen that more direct pressure can be applied in the direction of voids 123, whereas, less direct pressure can be applied between perforations, and therefore, as shown in grids 125 and 129, it may be desirable to orient the perforations so that they direct the $LCO_2$ injections toward the furthest-away output pipes 122, rather than toward the closer output pipes.

Once the $LCO_2$ has been pressurized and chilled, as discussed above, the $LCO_2$ is ready to be injected into input pipe 120 within the vertical borehole that passes the underground strata to the portion of the pipe 133 that is perforated with small diameter holes. However, in one embodiment, it is desirable to inject a predetermined amount of liquid nitrogen into the input pipe 120 first, which helps to pre-chill the pipe, so that when the $LCO_2$ is injected, the pipe will be cold enough to avoid disadvantageously causing the $LCO_2$ to warm up and change phase to a gas prematurely.

For example, the vertical input pipe 120 and its surroundings can be chilled with liquid nitrogen (at minus 321° F.) until the pipe attains a steady-state temperature of about minus 60° F. or less. It is not expected that the pipe will stay at minus 60° F. because there will be some heat transfer from the surrounding soil and rock to the $LCO_2$. Therefore, a thermocouple (not shown) is preferably attached to the pipe at a predetermined depth to show when the input pipe reaches a certain temperature and therefore is ready to accept the pressurized $LCO_2$ without flashing to $GCO_2$. It can be seen that the liquid nitrogen will continuously flash off to nitrogen vapor and vent upwards from the pipe entrance to the surface during this process. Thus, it will be helpful to use the thermocouple to determine when the appropriate temperature has been reached and when the inflow of liquid nitrogen is completed and can be stopped.

The $LCO_2$ cryogenic pump 68 is preferably connected to the input pipe 120 through a transfer line that is preferably well into the ground. Thus, once the input pipe 120 is sufficiently chilled, the $LCO_2$ can be allowed to flow into the input pipe 120 and flash to $GCO_2$ until a steady state operation can be reached. That is, when the cold $GCO_2$ backpressure builds to the design backpressure for the safe operation of the cryogenic pump 68, preferably, the pump 68 is turned on and will continue to pump until the input pipe 120 pressure builds to a predetermined amount, such as 4,660 psia or more, depending on the condition of the formation.

Initially, pump 68 is preferably kept on but set at a low $LCO_2$ flow rate to makeup for the $LCO_2$ that is penetrating into the stratum below. The pump 68 will then be set to the required level, such as at 5,123 GPM, and this will continue for a predetermined amount of time while the $LCO_2$ is being injected into the targeted strata. The amount of pressure used (as well as the initial temperature of the $LCO_2$) is preferably predetermined to ensure there is sufficient pressure to create the fractures and fragments in the strata.

Preferably, each input pipe 120 is connected to the cryogenic pump 68, such that cold $LCO_2$ under pressure can be injected and released into the targeted rock formation through the perforations. Preferably, there is a shut off valve on each pipe 120, 122 so that while the injection is being performed, or after the injection is completed, each pipe can be closed to allow the underground pressure to build up and/or be maintained within the formation. Output pipes 122 are preferably closed first, while the pressure is building, and input pipe 120 is preferably closed later, after the injection has been completed, wherein pressure within the formation can be maintained after the injection is stopped.

FIG. 11 shows the present method in an abandoned coal mine, wherein input pipe 120 is positioned within soil 128 and down into an abandoned tunnel 124 where there are layers of coal 126. As can be seen, when the $LCO_2$ is injected into input pipe 120 and released through the perforations, the $LCO_2$ is injected into the tunnel 124 where the $LCO_2$ can be adsorbed onto the surface of the coal, and wherein $CH_4$ can be desorbed from the coal and released into tunnel 124. Pressure is preferably allowed to build by sealing output pipes 122, wherein the relatively high pressure and low temperature can help to cause the $LCO_2$ to be adsorbed and the $CH_4$ to be desorbed, such that natural gas can be recovered through pipes 120 and 122. In addition to output pipes 122, which can be opened for gas recovery, input pipes 120 can also be opened once the injection has stopped, to allow for increased gas recovery.

FIG. 12 shows the present method using input pipe 120 positioned within soil 128 and down into an underground coal or gas shale stratum 130 where there are layers of coal or gas shale present. When the $LCO_2$ is injected into input pipe 120 and released through the perforations at 133 under pressure, the coal or shale will begin to break up and form fractures therein, i.e., it will become rubblized, wherein long narrow passages can be created within the formation to increase its permeability, as shown in FIGS. 17 to 19. The broken fragments 132 created by this process then become susceptible to adsorption of $LCO_2$ and $GCO_2$ and desorption of $CH_4$. At this point, the output pipes 122 are preferably closed, as shown in FIG. 17, to allow the pressure inside the formation to build up. Once the injection is stopped, input pipe 120 is also preferably closed, as shown in FIG. 18, such that the pressure within the stratum can be maintained at a predetermined amount, while adsorption and desorption continue.

FIG. 13 shows a similar method and apparatus using input pipe 120 positioned within soil 128 and down into an underground coal or gas shale stratum 130, but in this case, input pipe 120 has a bent horizontal portion 134 which is directed laterally within the targeted formation. When the $LCO_2$ is injected into input pipe 120 and released through the perforations which are laterally oriented (with output pipes 122 closed), the $LCO_2$ will be injected through the horizontal pipe 134, and into the stratum, thereby causing the coal or shale to break up in those directions, i.e., again, it will become rubblized to increase the permeability of the formation. The broken fragments 132 created by this process are then more susceptible to adsorption of $CO_2$ and desorption of $CH_4$. Once the injection is stopped, input pipe 120 is preferably closed, such that the pressure within the stratum can be maintained at a predetermined amount.

When the targeted rock formation is a relatively thin strata, to enhance the reach of the fracturing method, the bottom portion 134 of the input pipe 120 can be extended horizontally into the rock formation as shown in FIG. 13. The horizontal portion 134 in such case is preferably provided with perforations that extend laterally to allow the $LCO_2$ to be released and injected laterally into the targeted rock formation. The distance that the horizontal portion 134 extends into the formation can be based on the nature and size of the targeted strata. For example, horizontal portion 134 can be extended about half or more of the distance from the input pipe 120 to the nearest output pipe 122. Thus, if the distance to the nearest output pipe is 1,000 feet, the horizontal portion can be extended about 500 feet or more.

It should be noted that the amount of $LCO_2$ injected into the layer 130 is calculated by the adsorption capacity of the zone around each input pipe 120, and the thickness of the coal or shale layer 130. Thus, after the calculated amount of $LCO_2$ has been injected into the input or injection pipe 120, the valve of the input pipe is preferably closed (the valves of the surrounding recovery pipes 122 were closed previously).

By forcing the high pressure liquid $LCO_2$ into a shale or coal bed stratum via a pre-chilled vertical pipe with an end extension of perforations, the high pressure (>4,660 psia) liquid $LCO_2$ is vented through each of the circular hole perforations in the pipe and fractures a long cavity of small diameter (pencil-like) openings or voids 123 in all radial directions extending from the perforated pipe. The high pressure liquid $LCO_2$ is preferably forced through each perforated hole in the pipe and penetrates the shale or coal bed stratum, wherein, when the pressure exceeds the fracture gradient of the rock formation, fractures are created in the rock.

The factors used to determine the formation fracturing pressure are a function of well depth in units of psi/ft. For example, a fracture gradient of F=0.823 psi/ft in a well with a true vertical depth of 1,000 feet would predict a total fracturing pressure of 823 psi. At 5,000 feet depth, on the other hand, it would predict a fracture pressure of 4,115 psi (based on 5,000×0.823 psi/ft.).

When the $LCO_2$ is delivered to the stratum at pressures above the stratum's fracture gradient, a void is typically generated as the fracture enlarges, wherein the $LCO_2$ in the void enlarges the long pencil-like fracture and also creates additional smaller fractures that radiate from the main fracture. The $LCO_2$ then fills not only the main fracture but also the radiating fracture voids as well.

The goal of this process is to cause narrow fractures and fissures to be formed in the rock formation, such as those shown in FIGS. 17 to 19, which increases the formation's permeability. This allows more of the coal and/or gas shale fragments to be exposed to $LCO_2$, such that more adsorption can take place, throughout a greater area within the geographic site, which means that more $LCO_2$ can be sequestered, which in turn, also means that a greater amount of natural gas can be desorbed, released and recovered from the site.

Figure 14:
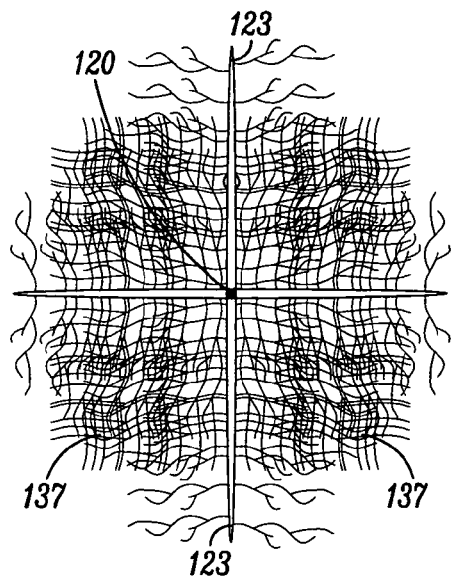
FIG. 14 shows in plan view a typical input pipe within a coal or gas shale formation with four narrow directional voids created by the high pressure liquid $CO_2$ injected through four perforations in the pipe, and the web-like fractures they create.

FIG. 14 shows the web-like pattern of fractures in plan view that can be created by the present fracturing method. In particular, it shows how the four holes in the pipe 120 can disperse the $LCO_2$ under pressure in four different directions to create a series of fracture voids 123 as well as a web-like pattern of fractures 137 extending in all different directions. Even though the perforations are preferably annularly located in four specific locations at any given depth of pipe, and the $LCO_2$ is released as a jet from those perforations, i.e., corresponding to the voids 123, the pressure gradient created by releasing the $LCO_2$ under pressure can cause the surrounding areas to break up as well. Thus, while FIG. 14 shows the $LCO_2$ that is continuously pressurized by the high pressure cryogenic pump on the surface, it also shows the long pencil-like horizontal openings that are formed 123, as well as the spreading of the surrounding cracks that are widened by the newly created field of stress. The length of the high stress field that is formed can extend to 2,500 feet or more in length.

FIG. 17 shows an initial phase wherein the output pipes 122 are closed at the top 154, whereas, the input pipes 120 are open 156 to allow the $LCO_2$ to be injected into the rock formation 160. As can be seen, a fracture void 123 is preferably created in the direction of each perforation 162, wherein a web-like pattern of fractures 137 can also be created that extends beyond each void 123 in different directions. In particular, FIG. 17 shows how each perforation can disperse the $LCO_2$ under pressure in a horizontal direction to create a series of horizontally oriented fracture voids 123, while at the same time, the pressure gradient created by releasing the $LCO_2$ can cause the surrounding areas to break up and create a web-like pattern of fractures 137 extending in different directions.

FIG. 18 is similar to FIG. 17, but shows the next phase wherein both the input pipes 120 and output pipes 122 are closed at the top 154, wherein, the pressure within the formation 160 can be maintained. Again, as can be seen, a fracture void 123 is preferably created in the direction of each perforation 162 as the pressure jet is released, but as the injection is stopped, and the pressure is maintained within the formation, the web-like pattern of fractures 137 can continue to be extended in all different directions. This preferably continues for a predetermined amount of time, as the $LCO_2$ and $GCO_2$ continue to be adsorbed, and the $CH_4$ continues to be desorbed and released.

At some point, as will be discussed, there can be a dramatic phase change within the formation 160, which can explosively cause the $LCO_2$ to transition into a gas, $GCO_2$, wherein its expansion can cause greater fracturing along the joints and fractures. This can further increase the size of the fractures 137 extending through the formation, thereby increasing its permeability.

FIG. 19 is similar to FIGS. 17 and 18, but shows the next phase wherein all the pipes 120 and 122 are open to allow the $CH_4$ gas to escape and be recovered at the surface. Preferably, the pressure is released slowly, or gradually, such that the pressure within the formation can be maintained for a predetermined period of time. That way, not only may the fracture void 123 continue to form additional web-like patterns of fractures 137 within the formation, but more importantly, the $LCO_2$ and $GCO_2$ will continue to be adsorbed, and the $CH_4$ will continue to be desorbed, such that a greater amount of $CO_2$ can be stored, and a greater amount of natural gas can be released and recovered from the site.

FIG. 19 represents the time period after two weeks where it may be safe to recover the natural gas that has buoyed itself up toward the surface. In this respect, it is desired to open the natural gas relief valves slowly, i.e., to a small orifice area, to ensure that the pressure within the formation is still maintained in the production layers after the injection has stopped, and so that fracturing can continue and more $LCO_2$ and $GCO_2$ can continue to be adsorbed, and $CH_4$ can continue to be desorbed.

It is also expected that the relief of gas pressure will cause the fractured openings and voids to close in, which in turn, will trap the $LCO_2$ or $GCO_2$ that has yet to be adsorbed, and the natural gas that has been desorbed but has yet to migrate to the pipe. The timing of the valve opening thus preferably coincides with the recovery of the natural gas so that most of the $CO_2$ will have been adsorbed and most of the natural gas will have been recovered by the time the valves are opened and pressure is released.

As shown in FIGS. 17, 18 and 19, even though the rings of perforations are spaced vertically apart, and the $LCO_2$ is released only at the levels where the horizontal voids 123 are shown, by releasing the $LCO_2$ under sufficient pressure, the surrounding areas of rock, both above and below the perforations, are fractured and broken up, i.e., within a certain perimeter extending above and below each ring. Thus, a greater geographical area can be reached and fractured by using a single input pipe 120, wherein the fractures can reach as far as 1,000 feet or more from input pipe 120, but also extended above and below each void 123 by several feet, such that more $CO_2$ can be stored, and more natural gas can be released and recovered from the site.

Note that the fracture zone may only contain fractures that are about ½ inch in height, width or diameter, but nevertheless, the overall zone may extend horizontally to 2,500 feet or more in length parallel to the bottom and top surfaces of the layer and several feet above and below the void 123. The pressurized liquid not only forms a long cavity of small diameter (0.5 inch to 1 inch), but also causes fracturing to radiate all around the circumference from the horizontal cavity.

At these high pressures (>4,000 psi) and low temperatures the liquid $LCO_2$ exchanges place through adsorption with the natural gas ($CH_4$) at each exposed site of the gas shale or coal particle surface. The high pressure cryogenic pump 68 at the surface continues to apply pressure to continue the fracturing process while the input pipe 120 is open. When the cryogenic pump 68 at the ground level is stopped and all vents are closed shut, fracturing will continue and the pressure in the liquids starts to decrease because of the continuous opening of additional fracture volumes and adsorption of $LCO_2$. At these pressures and temperatures, however, the closed valves facilitate desorption of the natural gas ($CH_4$) and simultaneous adsorption of the $LCO_2$ which continues for an extended period of time.

In the present invention, unlike previous hydraulic fracturing methods, there is no need for a proppant to maintain the width of the fractures and openings created within the formation. This is because the main goal is to adsorb $CO_2$ onto the coal or gas shale fragments, which will occur when the fractures are open, and once the adsorption occurs, the $CO_2$ will be stored and sequestered within the formation, despite what happens when the pressure is released and the fractures are closed. That is, once the $CO_2$ has been adsorbed, and the $CH_4$ has been desorbed and released, half the goal of the present invention has been completed, i.e., the $CO_2$ has been sequestered, and thus, at that point, even if not all of the $CH_4$ has been released, so long as a sufficient amount of $CH_4$ has been released and recovered to offset the cost of the $CO_2$ capture method, then, the present invention is useful. That is, for the time that the fractures are open, natural gas will continue to be released from the fragments and flow from the rock formation to the well bore, such that a sufficient amount of natural gas can be recovered to offset the cost of capturing the $CO_2$ gas. Since the goal of sequestering $CO_2$ is as important as collecting natural gas, the method is useful even if some of the natural gas released from the coal and/or shale remains trapped within the formation. The goal is for sufficient amounts of natural gas to be recovered to offset the cost of capturing the $CO_2$ gas, so even if the fractures and openings are closed, and not all of the natural gas formed in the formation rises and is recovered, the method is useful.

Indeed, portions of the $LCO_2$ within the cracks can act as the proppants when they are yet to be adsorbed onto the surfaces they are propping. In this case, no proppant is needed to keep the existing fractures and newly formed fractures from closing to recover the natural gas, but rather, because the adsorption is increased by high pressure and low temperature, the high pressure liquid carbon dioxide ($LCO_2$) can be adsorbed in greater quantities onto the surfaces of the rubblized layer of coal or shale, which occurs before the pressure is released and the openings are closed.

The newly created surfaces within the drill hole and radiating cracks can cause the $LCO_2$ to warm up, although at great depth where there is high pressure, the $LCO_2$ will likely remain a liquid despite the warming. Nevertheless, as the cracks form, and pressure is reduced, at some point, the $LCO_2$ will turn into $GCO_2$.

When the cryogenic pump is shut down, the liquid pressure decreases, and when it decreases a sufficient amount, along with a sufficient temperature increase, the liquid $CO_2$ can suddenly change phase explosively and the gaseous $CO_2$ can reach into the cracks and create more exposed surface within the stratum, thereby creating additional sites for $CO_2$ sequestration and more natural gas release. When the high pressure $LCO_2$ finally warms and explosively expands there will be cracks formed that extend radially as far as, in some cases, 2,500 feet. This process of rubblization exposes the material in the product zone by forming a multitude of smaller particles and a huge sum of exposed surfaces are made available for the capture of $GCO_2$ and the release of $CH_4$.

While it is preferable that this phase change occurs after the pump is turned off, and the pipes are closed, because the $LCO_2$ is warmed by the temperature of the surrounding rock, there is a possibility that the phase change could occur before the pipes are closed. Indeed, because of the lower pressures that exist at shallower depths, this may be more likely to occur in a shallower formation. Thus, at shallower depths, natural ambient warming in the coal or shale layer may cause an explosive change of phase to occur from liquid $CO_2$ to gas $CO_2$ early on, wherein the $LCO_2$ or $GCO_2$ adsorption can further displace the methane $CH_4$. On the other hand, when the fractures continue to form, there may be a drop in pressure, whereas, closer to the pump, the pressure can be maintained, and thus, there is the possibility that pressure could remain higher nearer to the surface.

In any event, this sudden phase change radiates fractures in all directions to further rubblize the stratum. The proposed approach will attain the explosive rubblization effect by introducing high pressure liquid $CO_2$ into the pipe and releasing it through the holes to create a high pressure liquid $CO_2$ jet. It will be necessary for the cryogenic pump to sustain the pressure of the $LCO_2$ in ever increasing volumes of fractures when the ambient shale or coal is at greater depth (high ambient stress) where the fractures occur to prevent premature vaporization. On the other hand, when the local warm shale or coal at shallow depth (low ambient stress) causes the liquid $CO_2$ to flash into gaseous $CO_2$, an even higher pressure can be achieved and further fragmentation occurs.

At a depth of 1,000 feet, for example, in a coal bed or shale layer that has a 0.823 psi/ft fracture gradient, only 823 psi $LCO_2$ forced through a one inch diameter hole in the pipe is needed to fracture and create a substantially horizontal 1,250 feet long, pencil-like cavity. Then, when the pressure drops to 400 psi, and the temperature warms to plus 40° F., for example (or elsewhere along the phase change line 85 in FIG. 7), the $LCO_2$ will flash off and explosively increase its specific volume to form $GCO_2$. This explosive effect causes more micro-fractures to occur, which facilitates the simultaneous desorption of $CH_4$ and the adsorption of $LCO_2$ or $GCO_2$.

In another example, at a depth of 5,000 feet, in a coal bed or shale layer that has a 0.9 psi/ft fracture gradient, 4,500 psi is needed to fracture and create a 1,250 feet long, horizontal pencil-like cavity. In such case, there will be no flashover to a gas even if the layer is warmer than plus 60° F. because of the greater pressures involved—the $CO_2$ will remain a liquid although it will require the action of the surface level pump to continuously supply the rated 4,500 psi to cause more and more fracturing and penetration of the $LCO_2$ into the natural cracks. Then, when all the required $LCO_2$ is supplied to meet the capacity of the layer to adsorb the $CO_2$, the pumping is stopped. Then, when the relief valves are opened to permit the gases in the system to be vented and captured for transport as natural gas, and/or when the pressure in the layer otherwise drops to a sufficient amount (such as by virtue of more cracks being created), the $LCO_2$ will explosively flash to GCO2 and cause more micro-cracks to occur. This $GCO_2$ will continue to be adsorbed onto the large surface area of the rubblized layer material.

Figures 20, 21:
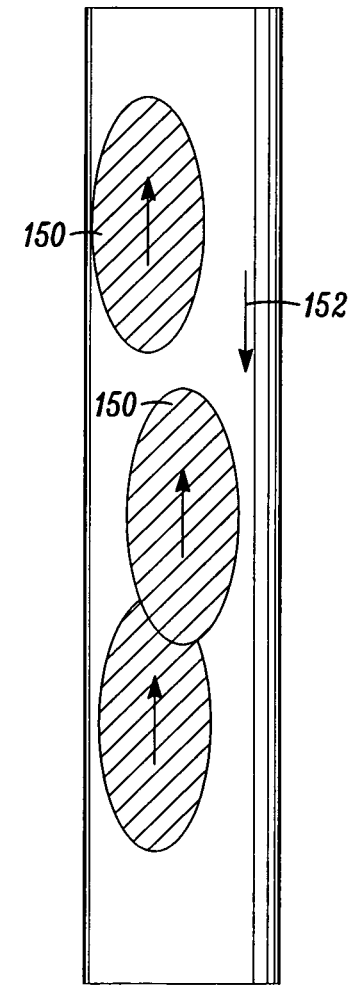
FIG. 20 shows a cross section of a pipe showing how the $CH_4$ rises and the $CO_2$ falls due to their relative densities.
FIG. 21 is a chart showing the relative densities of $CH_4$ and $CO_2$ at different pressures and at 40 degrees F.

The hugely increased fragmentation exposes more surface area of the shale or coal to the gaseous $CO_2$, and because there is more affinity for the surface to adsorb the $CO_2$ than to continue holding onto the natural gas adsorbed previously, the natural gas is desorbed and released. Then, because the released methane is light weight compared to the carbon dioxide that was introduced into the formation, the methane tends to migrate upwards through the pipes, as shown in FIG. 20.

With all vents of the $LCO_2$ input pipe and the natural gas output pipes closed, the pressurization of the shale or coal bed is allowed to be maintained or continued, and thus, the fracturing can continue, and CH4] $CH_4$ continues to be desorbed from the surface of each fracture in the presence of the high pressure gaseous $CO_2$, and $CO_2$ continues to be adsorbed into the available surfaces just made free by desorption of the $CH_4$. This containment is preferably sustained for as long as needed to permit the $LCO_2$ and $GCO_2$ to be completely adsorbed and the released lower density natural gas to migrate into the perforated vertical collection pipes and flow upward to be recovered. At these low temperatures the $CH_4$ is less dense than the $LCO_2$, so the $CH_4$ naturally rises.

The residence time for all the $LCO_2$ to convert to $GCO_2$ is preferably followed to ensure maximum conversion. The $GCO_2$ is adsorbed onto the surfaces of the rubblized production zone material and the natural gas is released. The present method contemplates waiting for the completion of the residence time wherein the exchange of $LCO_2$ or $GCO_2$ with natural gas ($LCH_4$) at each coal grain or shale grain site continues to occur. High pressure is preferably sustained during this process to reduce the required residence time.

After the waiting period, which can be about two weeks, the pipe valves are preferably opened, wherein the natural gas collection can proceed, although the rate of collection should be sufficiently slow to retain the necessary high pressure within the stratum. That is, if the $CH_4$H4 withdrawal pipe vents are opened too early, or too quickly, pressurized methane will begin rising to the top, but at the expense of a large amount of liquid $CO_2$ remaining within the formation that has yet to be adsorbed. By slowly opening the valves, and slowly reducing the pressure within the formation, this allows the low density $CH_4$ to buoy past the $LCO_2$ and allow the $CH_4$ to migrate to the recovery pipes, while at the same, allowing the $CO_2$ to continue to drop and be adsorbed, and $CH_4$ to continue to be desorbed. Once the cycle is complete, which can be ten to fourteen days, and most if not all of the natural gas has risen, the process can be complete. Then, the recovered $CH_4$ from the site can be transported via pipe or truck after it has been pressurized. And the same process can be repeated at another site, or within a predetermined amount of time, the same process can be repeated at the same site, to further increase the permeability and withdraw greater amounts of natural gas.

There will be a period when some of the $LCO_2$ or $GCO_2$ will mix with the natural gas, but during this period, the relative densities of the $GCH_4$ and $GCO_2$ will cause the $GCH_4$ 150 to rise and the $GCO_2$ 152 to return downward into the rubblized coal or shale, as shown in FIG. 20, for further adsorption and capture. FIG. 21 shows the relative densities of $CO_2$ and $CH_4$ within the various pressures at 40 degrees F. The heat of compression can cause $CO_2$ temperatures as high as 90 degrees F.

Figure 22:
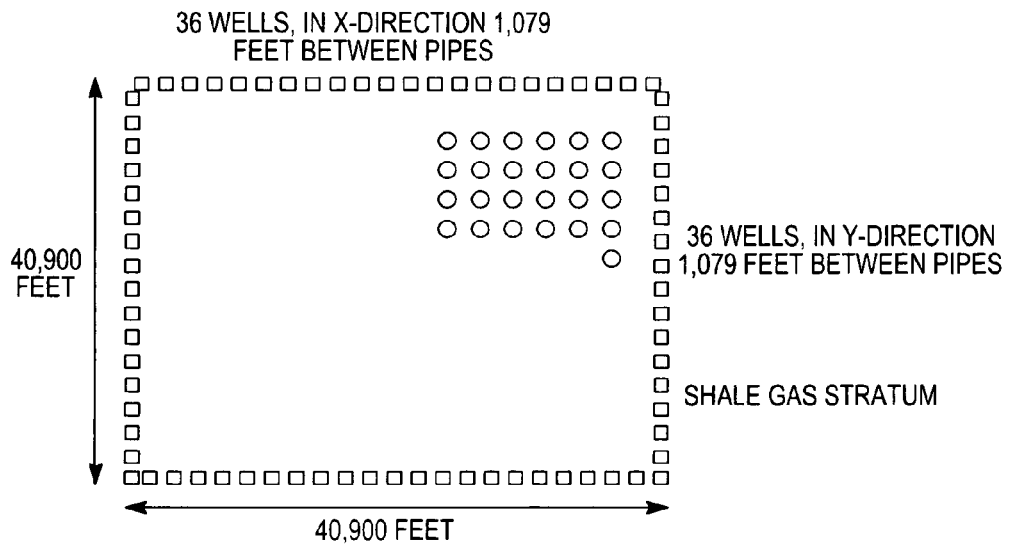
FIGS. 22 and 23 show in plan view two different patterns of arrays of input and output pipes for a single location, where the top one has 36 wells in each direction, and the bottom one has 22 wells in each direction.
Figure 23:
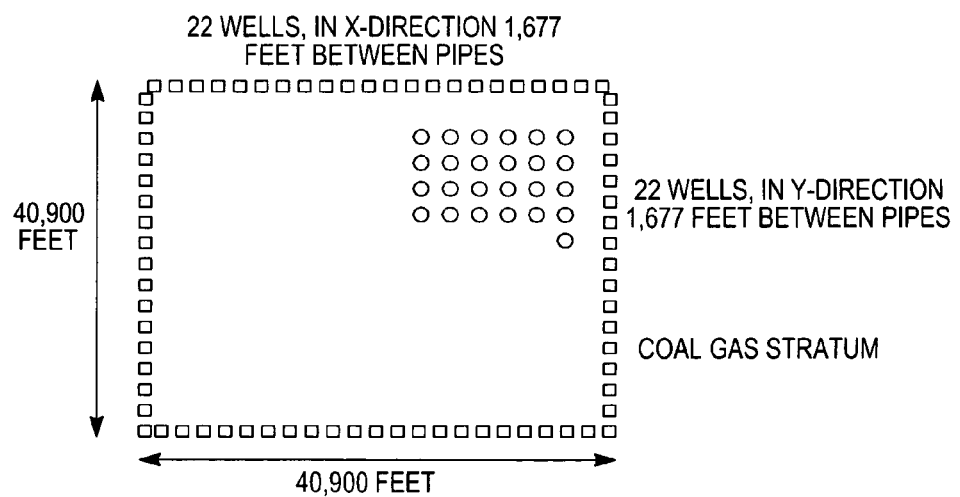

FIGS. 22 and 23 show two field patterns for well bores located at the same geographical site. FIG. 22 is a representation of the site with 36 wells in one direction and 36 wells in another direction, for a total of 1,236 wells, wherein there is a span of 1,079 feet between each well bore. This results in the field being 40,900 feet square in size. FIG. 23 is a representation of the same site with 22 wells in one direction, and 22 wells in another direction, for a total of 484 wells, wherein there is a span of 1,677 feet between each well bore. This results in the field being 40,900 feet square as well. Either pattern, or any variation of patterns, including square, rectangular or other configuration, can be used depending on the needs of the site.

What is claimed is:

1. A method of sequestering carbon dioxide and recovering natural gas from a coal or gas shale reservoir or formation, comprising:
    capturing or producing carbon dioxide gas from coal or from flue gases of a power plant, incinerator or chemical processing plant;
    injecting liquid nitrogen into an injection pipe to reduce the temperature thereof to minus 60 degree F. or less and using a thermocouple to measure the temperature of said injection pipe at a predetermined depth;
    pressurizing and cooling the carbon dioxide gas to create pressurized cold liquid carbon dioxide with no proppants or toxic additives added therein;
    injecting the pressurized cold liquid carbon dioxide through an underground transfer line connected to said injection pipe and extending said injection pipe into said reservoir or formation, wherein said injection pipe has perforations that allow the carbon dioxide to be released into said reservoir or formation;
    releasing the pressurized cold liquid carbon dioxide through said perforations and into said coal or shale and creating fractures therein;
    allowing the liquid carbon dioxide to adsorb onto the coal or shale and allowing natural gas to be desorbed and released from the coal or shale; and
    allowing the natural gas released from the coal or shale to pass through the fractures and toward said injection pipe or an additional recovery pipe, and allowing the natural gas to rise to the surface through said pipe or pipes.

2. The method of claim 1, wherein the method further comprises constructing said injection pipe using multiple layers of casings with concrete in between each layer with the perforations located at or near the bottom.

3. The method of claim 1, wherein prior to injecting the pressurized cold liquid carbon dioxide into said injection pipe, said recovery pipe is closed to allow pressure to build up within said reservoir or formation, and wherein after the cold liquid carbon dioxide has been injected into said reservoir or formation, and pressure has been allowed to build up therein, the injection is stopped.

4. The method of claim 3, wherein after the cold liquid carbon dioxide has been injected into said reservoir or formation, and pressure has been allowed to build up therein, said injection pipe is closed to allow the liquid carbon dioxide to continue to be adsorbed into the coal or shale, and wherein after a predetermined amount of time, said pipes are opened gradually in small increments to allow the natural gas to be released to the surface gradually, but at the same time, for the pressure of the gas or liquid within said reservoir or formation to be maintained above a predetermined minimum for a predetermined amount of time.

5. The method of claim 4, wherein after sufficient time has passed to allow the carbon dioxide to be adsorbed into the coal or shale, and for the natural gas to be desorbed and released, said pipes are opened to allow the natural gas released from said reservoir or formation to rise to the surface and be recovered through said pipes.

6. The method of claim 1, wherein the temperature of the cold liquid carbon dioxide is allowed to warm up, or the pressure is allowed to drop, such that a sudden phase change from a liquid to a gas can occur, wherein the transition of the liquid carbon dioxide to a gas causes the liquid to expand and create additional fractures within said reservoir or formation.

7. The method of claim 1, wherein injecting the cold liquid carbon dioxide comprises using multiple arrays of injection and recovery pipes wherein said arrays are oriented such that the perforations of the injection pipes extending along one row of pipes are offset from the orientation of the perforations of the injection pipes extending along an adjacent row of pipes, and wherein the method comprises injecting the carbon dioxide at different angles to increase the coverage and reach of the injections.

8. A system for sequestering carbon dioxide and recovering natural gas from a coal or gas shale reservoir or formation, comprising:
    a device that produces carbon dioxide gas or captures and separates carbon dioxide gas from flue gases of a power plant, incinerator or chemical processing plant;
    a mechanism that pressurizes and cools the carbon dioxide gas to create pressurized cold liquid carbon dioxide with no proppants or toxic additives added therein;
    at least a first injection pipe extended into said reservoir or formation wherein said injection pipe comprises multiple layers of casings with concrete in between each layer with perforations that allow the liquid carbon dioxide to be released into said reservoir or formation;
    liquid nitrogen injected within said first injection pipe to reduce the temperature of said injection pipe to minus 60 degree F. or less;
    a thermocouple to measure the temperature of said injection pipe at a predetermined depth and an underground transfer line to transfer the cold liquid carbon dioxide from said mechanism to said injection pipe;
    fractures within said reservoir or formation created by injecting the pressurized cold liquid carbon dioxide into said injection pipe and allowing the cold liquid carbon dioxide to be released under pressure through said perforations into said reservoir or formation;
    a sudden phase change of the cold liquid carbon dioxide from a liquid to a gas, wherein the transition of the liquid carbon dioxide to a gas causes the liquid to expand and create additional fractures within said reservoir or formation;
    natural gas within said reservoir or formation desorbed and released from the coal or shale as the carbon dioxide is adsorbed onto the coal or shale; and
    at least one recovery pipe extended upward from said reservoir or formation through which the natural gas released from the coal or shale can be recovered at the surface.

9. The system of claim 8, wherein said at least one recovery pipe is provided with a valve that closes to allow the pressure within said reservoir or formation to build up as the pressurized cold liquid carbon dioxide is injected into said injection pipe.

10. The system of claim 9, wherein said injection pipe is provided with a valve that closes to allow the pressure within said reservoir or formation to build up or be maintained after the cold liquid carbon dioxide has been injected into said injection pipe.

11. The system of claim 8, wherein a second injection pipe that extends substantially vertically and then substantially horizontally into said reservoir or formation is provided, and wherein said first and second injection pipes are provided with valves capable of being opened gradually to allow the natural gas released from the coal or shale to rise to the surface gradually, while at the same time, the pressure within said reservoir or formation to be maintained above a predetermined minimum.

12. The system of claim 11, wherein multiple arrays of injection and recovery pipes are provided, and wherein each array has one injection pipe surrounded by four to eight recovery pipes.

13. The system of claim 12, wherein said recovery pipes are located a predetermined distance from said injection pipes, and said arrays are oriented such that they form a grid pattern of pipes.

14. The system of claim 13, wherein said arrays of pipes are oriented such that the perforations of the injection pipes extending along one row of pipes are offset from the orientation of the perforations of the injection pipes extending along an adjacent row of pipes within said grid pattern.

15. The system of claim 14, wherein the perforations between the adjacent rows of injection pipes are offset at an angle of about forty five degrees relative to each other.

16. A method of recovering natural gas from a reservoir having coal or shale therein, comprising:
providing a first injection pipe that extends into said reservoir;
injecting liquid nitrogen into said first injection pipe and reducing the temperature of said injection pipe to minus 60 degree F. or less;
using a thermocouple to measure the temperature of said injection pipe at a predetermined depth within said injection pipe;
pressurizing and cooling carbon dioxide gas to create pressurized cold liquid carbon dioxide;
providing at least one recovery pipe extended into said reservoir and closing a valve on said recovery pipe;
injecting the pressurized cold liquid carbon dioxide into said injection pipe, wherein said injection pipe has perforations that allow the carbon dioxide to be released into said reservoir;
releasing the pressurized cold liquid carbon dioxide through said perforations into said reservoir and creating fractures within said reservoir;
causing the pressure within said reservoir to build up and allowing the pressurized cold liquid carbon dioxide to be adsorbed onto the coal or shale found in said reservoir and the natural gas in the coal or shale to be desorbed therefrom;
turning off the injection of the cold liquid carbon dioxide and closing a valve on said injection pipe;
allowing the temperature of the cold liquid carbon dioxide within said reservoir to be increased or the pressure within said reservoir to be reduced, thereby causing the cold liquid carbon dioxide to change phase from a liquid to a gas, thereby creating expansion and more fractures within said reservoir; and
gradually opening said injection pipe, and said at least one recovery pipe, to allow the natural gas formed within said reservoir to rise to the surface through said pipes without substantially releasing the pressure within said reservoir too quickly.

17. The method of claim 16, wherein the method further comprises constructing said injection pipe using multiple layers of casings with concrete in between each layer with the perforations located at or near the bottom thereof.

18. The method of claim 16, wherein after the cold liquid carbon dioxide has been injected into said reservoir, and pressure has been allowed to build up therein, said valves on said pipes are allowed to remain closed for a predetermined amount of time, to allow the cold liquid carbon dioxide to continue to be adsorbed, and the natural gas to continue to be desorbed and released within said reservoir.

19. The method of claim 18, wherein after sufficient time has passed, said valves on said pipes are opened completely to allow the natural gas released from the coal or shale to rise to the surface and be recovered through said pipes.

20. The method of claim 16, wherein injecting the cold liquid carbon dioxide comprises using multiple arrays of injection and recovery pipes wherein said arrays are oriented such that the perforations of the injection pipes extending along one row of pipes are offset from the orientation of the perforations of the injection pipes extending along an adjacent row of pipes, and wherein the method comprises injecting the carbon dioxide at different angles to increase the coverage and reach of the injections.

* * * * *